(12) United States Patent
Huang

(10) Patent No.: US 7,299,520 B2
(45) Date of Patent: Nov. 27, 2007

(54) CONNECTING DEVICE FOR A WINDSHIELD WIPER HAVING NO SUPPORT FRAME AND HOOK TYPE WINDSHIELD WIPER ARM

(76) Inventor: Shih-Hsien Huang, 7F. -2, No. 37, Jhengsin St., Zuoying, District, Kaohsiung City (TW) 813

( * ) Notice: Subject to any disclaimer, the term of this patent is extended or adjusted under 35 U.S.C. 154(b) by 0 days.

(21) Appl. No.: 11/387,785

(22) Filed: Mar. 24, 2006

(65) Prior Publication Data
US 2007/0220698 A1 Sep. 27, 2007

(51) Int. Cl.
*B60S 1/40* (2006.01)
(52) U.S. Cl. .................... 15/250.32; 15/250.43
(58) Field of Classification Search ............ 15/250.32, 15/250.43, 250.44
See application file for complete search history.

(56) References Cited

U.S. PATENT DOCUMENTS

| | | | |
|---|---|---|---|
| 5,611,103 A | 3/1997 | Lee | |
| 5,937,474 A | 8/1999 | Hussaini | |
| 6,161,249 A | 12/2000 | Hussaini | |
| 6,332,236 B1 | 12/2001 | Ku | |
| 6,539,576 B2 | 4/2003 | Kim | |
| 6,591,445 B2 | 7/2003 | Nacamuli | |
| 6,640,380 B2 | 11/2003 | Rosenstein | |
| 6,643,889 B1 | 11/2003 | Kotlarski | |
| 6,668,419 B1 | 12/2003 | Kotlarski | |
| 6,675,432 B1 | 1/2004 | De Block | |
| 6,687,948 B2 | 2/2004 | Kotlarski | |
| 6,782,581 B2 | 8/2004 | De Block | |
| 6,799,348 B1 | 10/2004 | Swanepoel et al. | |
| 6,810,556 B1 | 11/2004 | Kotlarski | |
| 6,836,926 B1 | 1/2005 | De Block | |
| 6,874,195 B2 | 4/2005 | Kotlarski et al. | |
| 6,904,639 B2 | 6/2005 | Dietrich et al. | |
| 6,910,244 B2 | 6/2005 | De Block et al. | |
| 2004/0010882 A1 | 1/2004 | Breesch | |
| 2004/0023280 A1 | 2/2004 | Loyd et al. | |
| 2004/0025280 A1 | 2/2004 | Krickau | |
| 2004/0098821 A1 | 5/2004 | Kraemer et al. | |
| 2004/0211021 A1 | 10/2004 | Weber et al. | |
| 2004/0216260 A1 | 11/2004 | Genet | |
| 2005/0011033 A1 | 1/2005 | Thomar et al. | |
| 2005/0039292 A1 | 2/2005 | Boland | |

FOREIGN PATENT DOCUMENTS

WO    WO 2005/102802    *  2/2005

* cited by examiner

*Primary Examiner*—Gary K. Graham
(74) *Attorney, Agent, or Firm*—Bacon & Thomas, PLLC

(57) ABSTRACT

The present invention is to provide a connecting device for a windshield wiper having no support frame and hook type windshield wiper arm, which comprises a chassis, a saddle hood, a sliding cover and a connector; By means of buckling two insetting juts on the sliding rails with two insetting holes on the left side panel and right side panel of said chassis, said sliding cover can quickly sliding out away said saddle hood in buckling fixed position unable to detach off each other; Thereby, during dismounting and mounting procedure of the hook head on the hook-type wiper arm with said connector, not only without any help in holding said sliding cover from anyone else but also eliminating the interference of bumping from said sliding cover sliding back unwillingly only one person can easily and quickly complete all process.

2 Claims, 22 Drawing Sheets

CONNECTING DEVICE FOR A WINDSHIELD WIPER HAVING NO SUPPORT FRAME AND HOOK TYPE WINDSHIELD WIPER ARM

FIELD OF THE PRESENT INVENTION

The present invention relates to a connecting device for a windshield wiper having no support frame and hook type windshield wiper arm, particularly contriving for the special connecting device exclusively used in conventional support frameless wiper and hook-type wiper arm; The replacing procedure of the support frameless wiper and hook-type wiper arm, Not only without any help from anyone else but also eliminating any interference, all the replacing process of the support frameless wiper and hook-type wiper arm can be easily and quickly completed by only one person.

BACKGROUND OF THE INVENTION

Nowadays, the windshield wiper most used in automobiles can be categorized into two types of "support framed wiper" and "support frameless wiper", wherein: the "support framed wiper" has been used on a mass scale in all old cars for being developed quite a long time; However, the "support frameless wiper" has been lately used in new cars with trend to gradually replace the obsolete "support framed wiper" overall owing to its better scrubbing effect and longer service life as well as environment protection effect in reducing material of support frame. Besides, most of the head type of the wiper arm matched said "support framed wiper" are hook type; A special connector of unitary plastic extruding molded body must be adopted to joint said "support framed wiper" with hook-type wiper arm into an integral unit so as to have the expected scrubbing effect on the windshield, such as USA issued patents disclosure in numbers of U.S. Pat. No. 6,640,380, U.S. Pat. No. 6,591,445, U.S. Pat. No. 6,539,576, U.S. Pat. No. 6,332,236, U.S. Pat. No. 6,161,249, U.S. Pat. No. 5,937,474 and U.S. Pat. No. 5,611,103.

Moreover, the head type of the wiper arm matched said "support frameless wiper" is different from the wiper arm to the wiper arm as the structure of said "support frameless wiper" is completely different from that of said "support framed wiper"; An exclusive connecting device for each head type of the wiper arm must be contrived to joint with said "support frameless wiper", such as USA patents issued in numbers of U.S. Pat. No. 6,675,432, U.S. Pat. No. 6,799,348, U.S. Pat. No. 6,904,639, U.S. Pat. No. 6,874,195, U.S. Pat. No. 6,810,556, U.S. Pat. No. 6,643,889, U.S. Pat. No. 6,668,419, U.S. Pat. No. 6,687,948, U.S. Pat. No. 6,782,581, U.S. Pat. No. 6,836,926 and U.S. Pat. No. 6,910,244 as well as patent applications published in numbers of US2004/0216260, US2004/0010882, US2004/0211021, US2005/0011033, US2004/0025280, US2004/0098821 and US2005/0039292; All disclosed that the exclusive connecting device is adopted for each special different head type of the wiper arm.

However, for those huge number of consumers, who owns old car with said "support framed wiper" and wishes to replace into "support frameless wiper", can not obtain what is desired because no suitably exclusive connector for the traditional hook-type wiper arm on their cars to joint with said "support frameless wiper"; For consumer, who insists on replacing into "support frameless wiper", he must discard the existing hook-type wiper arm and replace into exclusive head type of wiper arm suitable with "support frameless wiper" on a higher expense basis; Therefore, some factories recently provide special connecting devices able to joint "support frameless wiper" with conventional hook-type wiper arm so as to remedy the aforesaid drawback as well as to reduce the economical burden of the consumers. The structure of such connecting device is shown in the FIGS. of 1 through 7 and 16, comprising a base 20, a frame hood 30, a pivotal cover 40 and connector 50. Said base 20, which being pressed of rigid metal, has a pair of horizontal clipping grooves 21 longitudinally facing each other and parallel juxtaposed apart at the bottom section of both side panels; A pair of symmetrical and parallel vertical left side panel 23 and right side panel 24 of same shape are erected apart on the both edges of the top surface 22, which connecting with both of said clipping grooves 21; And, a horizontal cross fixing spindle 25 transversely straddles over said left side panel 23 and right side panel 24; By means of said clipping grooves 21, said base 20 can be fixedly clipped on the elastic metal strip 11 of the support frameless wiper 10; Said frame hood 30, which being an unitary extruding molded body of a plastic material, has a pair of symmetrical and parallel vertical left hood panel 31 and right hood panel 32 of same shape are erected apart on its both sides; For both said left hood panel 31 and right hood panel 32, a horizontal cross mating spindle 33 transversely straddles over their front end, a vertical mating plate 34 is erected at their rear end, and a pair of symmetrical and parallel left inset groove 35 and right inset groove 36 of same shape with opening facing downwards are formed apart on inside at their middle section; A pair of left baffle lump 37 and right baffle lump 38 are set on inside at the top edges of both said left inset groove 35 and right inset groove 36; And, two pair of snap-fitting noses 39 are set on inner sides at the bottom edges of both said left hood panel 31 and right hood panel 32 corresponding to the opening direction of said left inset groove 35 and right inset groove 36; By means of said left inset groove 35 and right inset groove 36 as well as four snap-fitting noses 39, said base 20 with left side panel 23 and right side panel 24 can be fixedly inset inside of said frame hood 30 (as shown in g view of the FIG. 16); Said pivotal cover 40, which freely pivoting to cover on said frame hood 30, has a tubular groove 41 disposed on one short end and a pair of elastic snap-fitting barbs 42 erected at both side panels on another short end; By means of coupling said tubular groove 41 with said mating spindle 33 on said frame hood 30, said pivotal cover 40 can freely lift up and close down over top surface of the front portion at said frame hood 30 with said mating spindle 33 as fulcrum (as shown in A and B views of the FIG. 6); Said connector 50, which being an unitary extruding molded body of a plastic material similarly as conventional connector of the said "support framed wiper", to be inset between said left side panel 23 and right side panel 24 of said base 20, comprises a pair of symmetrical and parallel vertical left side plate 51 and right side plate 52 of same shape are erected apart on its both sides with a horizontal body plate 53 straddling over them to form an integral body; Wherein, a pair of buckling noses 54 are juxtaposed apart on the inside at the front ends of said left side plate 51 and right side plate 52 so as to form a space for just accommodating the hook head 61 of the hook-type wiper arm 60; Moreover, a round groove 55 with opening facing downwards is formed on the horizontal body plate 53, which locating at the middle section of said left side plate 51 and right side plate 52, to be coupled with said fixing spindle 25 on said base 20 so as to enable itself to pivot on said base 20 within a limited angle.

The shown in the FIG. 6 to FIG. 9 is the mounting assembly operation of said connecting device used in the traditional hook-type wiper arm 60: First, apply a force on said pivotal cover 40 by one finger to deform said two elastic snap-fitting barbs 42 so as to detach the clipping from said left inset groove 35 and right inset groove 36 (as shown in view B of the FIG. 6); By said mating spindle 33 means of fulcrum, said pivotal cover 40 can be freely lift up away said frame hood 30 (as shown in view D of the FIG. 7); Next, insert said hook head 61 of the hook-type wiper arm 60 between said left side plate 51 and right side plate 52 of said connector 50, and continuously apply force until it thoroughly getting into the space between said two buckling noses 54 and the front edge of said horizontal body plate 53 to finish the fixedly buckling (as shown in the FIG. 8 and each view of the FIG. 9 as well as view E of the FIG. 7); Finally, re-pivot said pivotal cover 40 to snap down on the top surface of said frame hood 30 so as to complete the mounting assembly operation.

Although the conventional connecting device aforesaid can achieve the purpose of jointing the "support frameless wiper" with said traditional hook head of the hook-type wiper arm, there are some drawbacks remain as below:

1. Refer to FIGS. of 10 through 12, during the operation procedure of replacing support frameless wiper 10, said conventional connecting device is always interfered by said pivotal cover 40 and results in being not smoothly; The reason is that said hook-type wiper arm 60 must be in upright position whenever replacing support frameless wiper 10; Namely, apply an upwards force (as shown in the FIG. 10) on said hook-type wiper arm 60 horizontally on the windshield G to let it become upright by the elastic foldable articulation 62 means of fulcrum so as to have said support frameless wiper 10 detached away said windshield G for replacing operation (as shown in the FIG. 11); Hence, said frame hood 30 is always in upright status no matter the procedure of dismounting or mounting operation such that said mating spindle 33 in topmost position to let said pivotal cover 40 freely pivot downwards and interfere with said hook head 61 (as shown with hypothetical line in view H of the FIG. 12); Thereby, during dismounting or mounting operation, said hook head 61 will collide with and may damage said pivotal cover 40 (as shown in view I of the FIG. 12) to cause extra trouble and working time; To avoid such phenomena aforesaid, a cumbersome helper is needed to temporarily hold said pivotal cover 40 (as shown in view J of the FIG. 12); That is big hindrance out of the consideration of the original designer.

2. Refer to FIGS. of 9, 10-A, 13 and 14, a resultant force F will be produced when said hook-type wiper arm 60 swings back and forth on the windshield G; Said hook head 61 will continuously butt and push against two said buckling noses 54 on said connector 50 under the action of vertical component force F1 (as shown in the FIG. 10-A); Finally, said hook head 61 will break away said connector 5 after certain period of time or certain number in swing of said hook-type wiper arm 60 (The procedure is as shown in reverse order of each view of the FIG. 9, namely from view d to view a); The reason is that a gap δ exists between said two left side plate 51 and right side plate 52 with said two left hood panel 31 and right hood panel 32 (as shown in the FIG. 14) to accommodate the displacement of two deformed buckling noses 54 by the butting and pushing from said hook head 61; The breaking away of hook head 61 from said connector 50 is a hidden trouble in the safety of car driving; That is another big drawback out of the safety consideration of the original designer.

3. Refer to FIGS. of 3 and 15 through 17, each of said mating spindle 33 and mating plate 34 is disposed on the front and rear respectively of said frame hood 30 to facilitate the lifting up and closing down of said pivotal cover 40 with itself; The cross section in round shape with smaller area of said mating spindle 33 and the cross section in square shape with larger area of said mating plate 34 make them have different stress strength (as shown in the FIG. 3); Said two snap-fitting noses 39 on said left hood panel 31 and right hood panel 32 are subjected to butting and pushing force from said left side panel 23 and right side panel 24 (as shown in view e of the FIG. 16) so that result in outwards expansion (as shown in view f of the FIG. 16); Meanwhile, both of said mating spindle 33 and mating plate 34 will bear same axial stress f from both of said left hood panel 31 and right hood panel 32 in consequence of the outwards expanding strain in the middle section; Thereby, one end of said mating spindle 33 with smaller area in cross section will break away from said left hood panel 31 and right hood panel 32 (as shown in the FIG. 17) so that damaging said frame hood 30; The situation aforesaid always happens in the mounting procedure and results in low yield; That is the other big drawback out of the consideration of the original designer.

SUMMARY OF THE INVENTION

The prime object of the present invention is to provide a connecting device for a windshield wiper having no support frame and hook type windshield wiper arm, which comprises a chassis, a saddle hood, a sliding cover and a connector; By means of buckling two insetting juts on the sliding rails with two insetting holes on the left side panel and right side panel of said chassis, said sliding cover can quickly sliding out away said saddle hood in buckling fixed position unable to detach off each other; Thereby, during dismounting and mounting procedure of the hook head on the hook-type wiper arm with said connector, not only without any help in holding said sliding cover from anyone else but also eliminating the interference of bumping from said sliding cover sliding back unwillingly only one person can easily and quickly complete all process.

Another object of the present invention is to provide a connecting device for a windshield wiper having no support frame and hook type windshield wiper arm; By means of two pressing tongues on said sliding cover filling the gap between said left side plate and the left side panel on the chassis as well as the gap between the right side plate and the right side panel on the chassis, two buckling noses on said left side plate and right side plate of the connector are prevented from displacing outwards to ensure having resistance to confront against the vertical component force and keeping the hook-type wiper arm from detaching off the connector during its swing motion; Thus, the 100% strict criterion in safety prerequisite under operation for the support frameless wiper and hook-type wiper arm can be achieved.

The other object of the present invention is to provide a connecting device for a windshield wiper having no support frame and hook type windshield wiper arm; The left hood panel and right hood panel on said saddle hood are spanned and jointed by the horizontal straddle panel and vertical rear hood panel of same rectangular cross section with equivalent area; Owing to four snap-fitting noses on said left hood panel and right hood panel being butted and pushed by the left side panel and right side panel on the chassis during inset mounting procedure of said saddle hood with chassis, Said straddle panel and rear hood panel can be evenly subjected to the axial stress owing to their same rectangular cross section with equivalent area; Thereby, no breaking damage of said straddle panel and rear hood panel of said left hood panel and right hood panel will happen; Thus, the overall yield of the connecting device can be increased in consequence of prevention of the damage of said saddle hood under such circumstance.

BRIEF DESCRIPTION OF THE DRAWINGS

FIG. 10-A is an operational view of the conventional hook-type wiper arm.

DETAILED DESCRIPTION OF THE PREFERRED EMBODIMENTS

Figure 1:
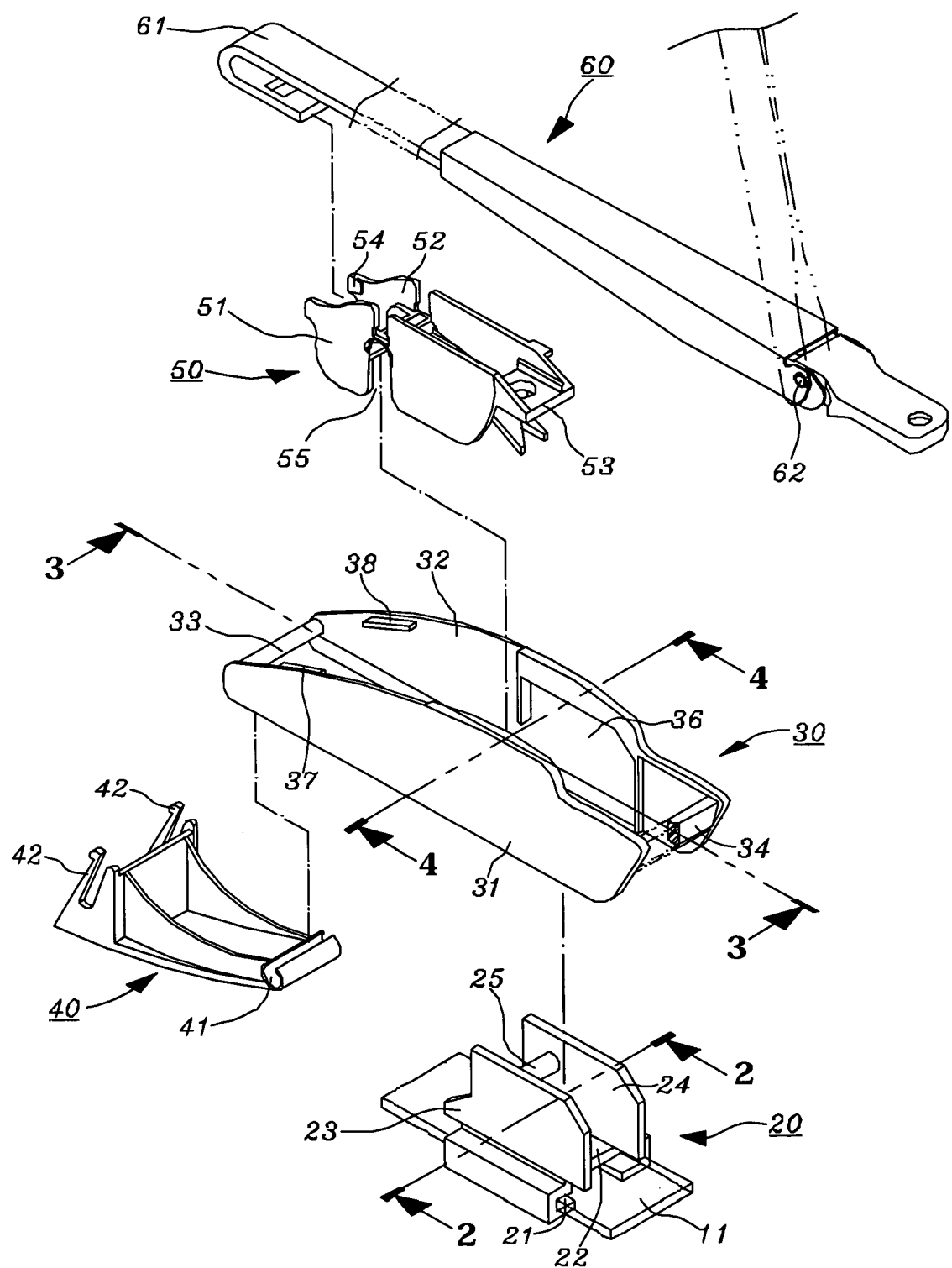
FIG. 1 is an exploded perspective view of the conventional connecting device used in support frameless wiper with hook-type wiper arm.
Figure 2:
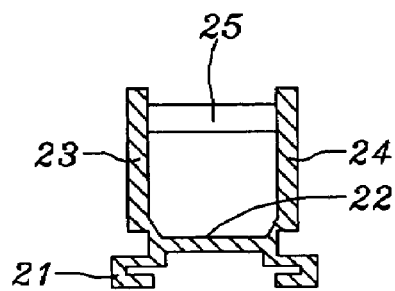
FIG. 2 is a sectional view taken along the direction indicated by a line 2-2 in FIG. 1.
Figure 3:
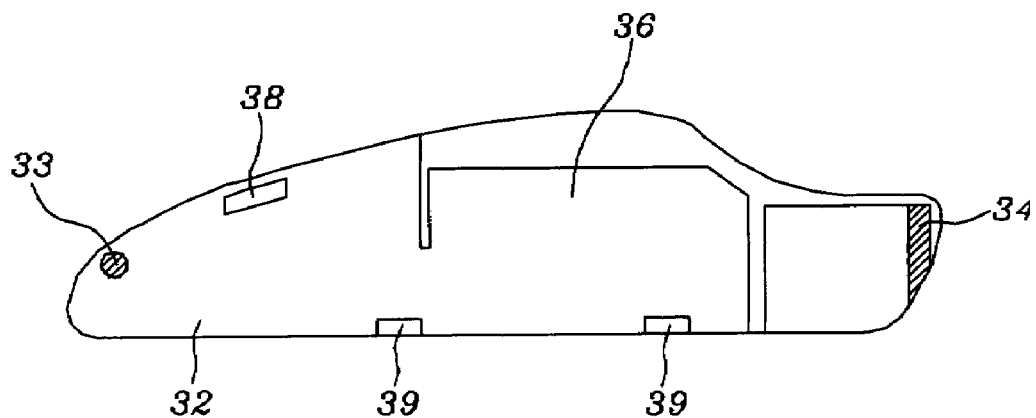
FIG. 3 is a sectional view taken along the direction indicated by a line 3-3 in FIG. 1.
Figure 4:
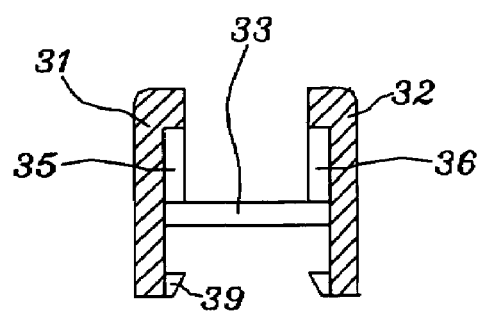
FIG. 4 is a sectional view taken along the direction indicated by a line 4-4 in FIG. 1.
Figure 5:
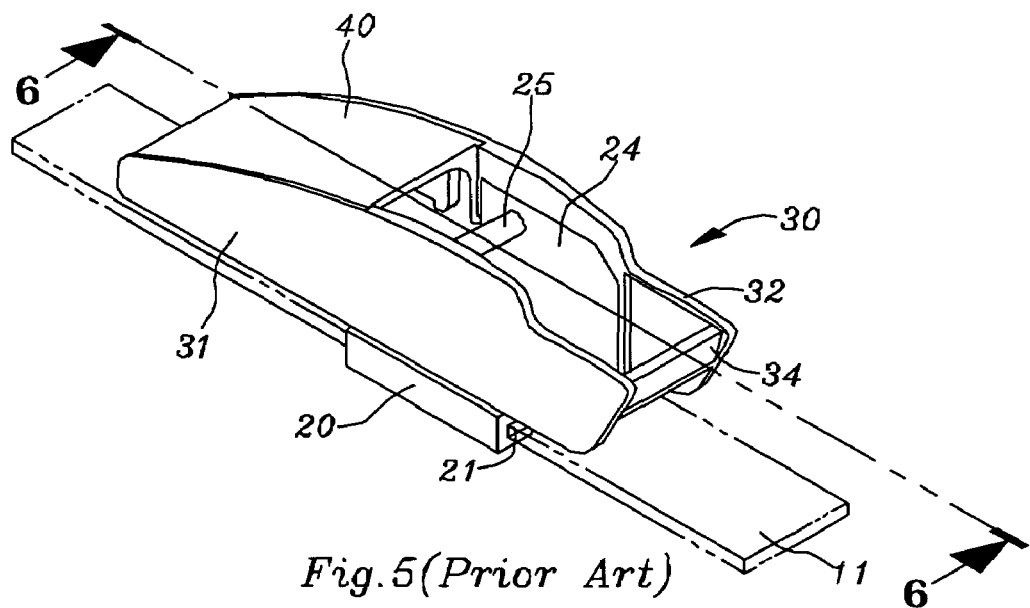
FIG. 5 is assembly perspective view of the conventional connecting device used in support frameless wiper with hook-type wiper arm.
Figure 6:
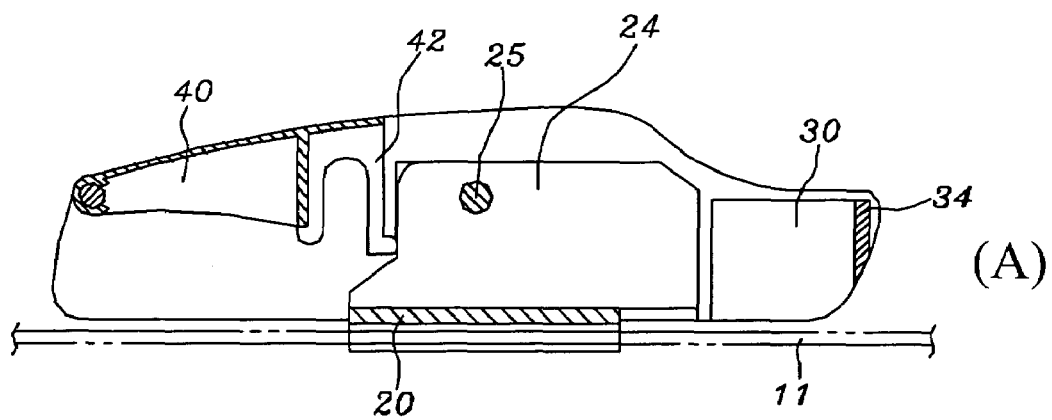
FIG. 6 is a sectional view taken along the direction indicated by a line 6-6 in FIG. 5.
Figure 6:
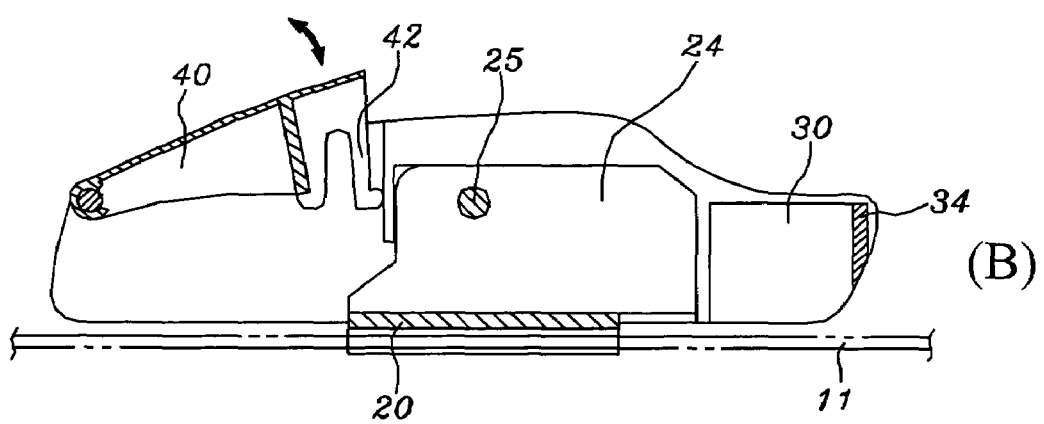
Figure 7:
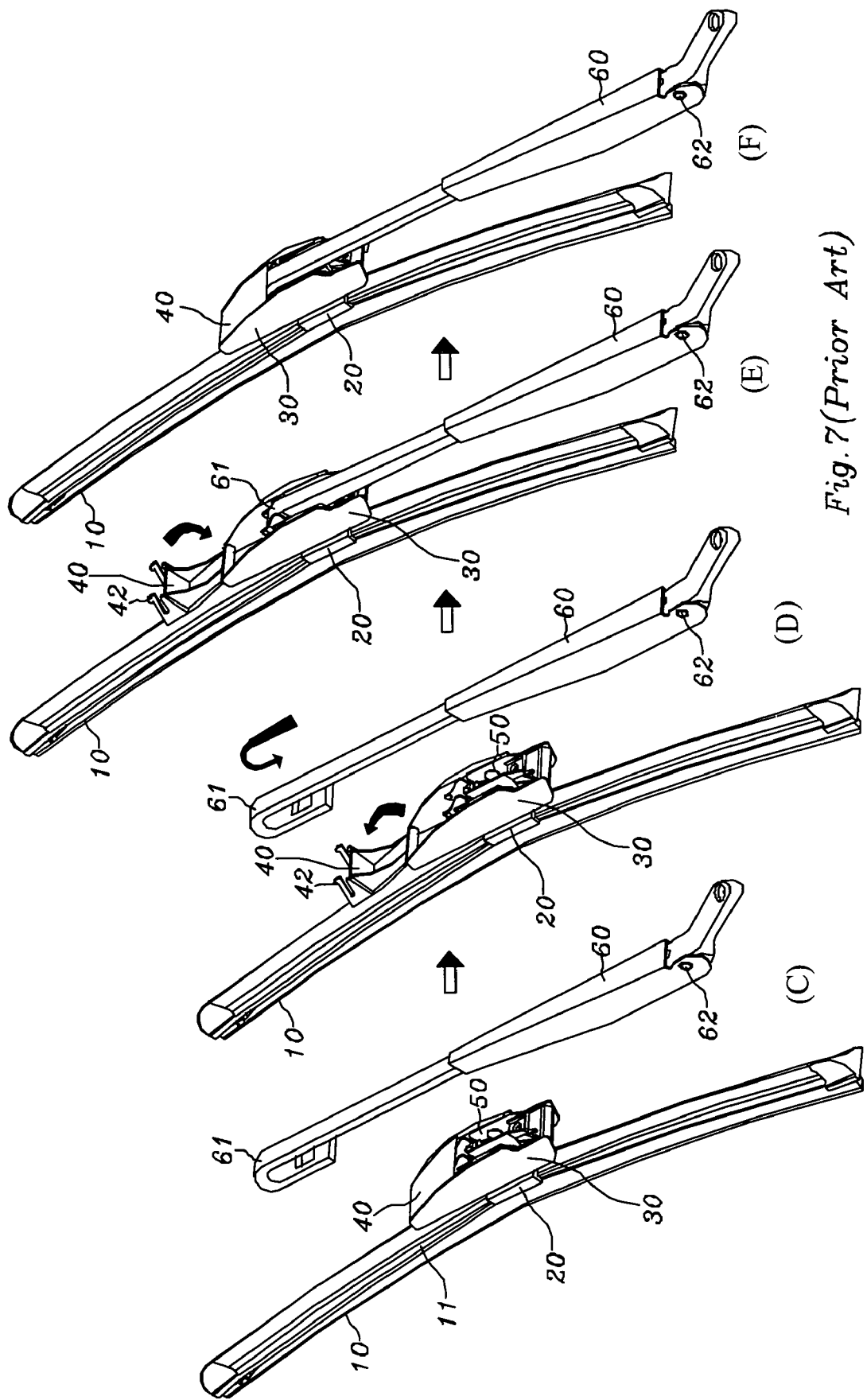
FIG. 7 is the illustrative operational view of the conventional connecting device used in support frameless wiper with hook-type wiper arm.
Figure 8:
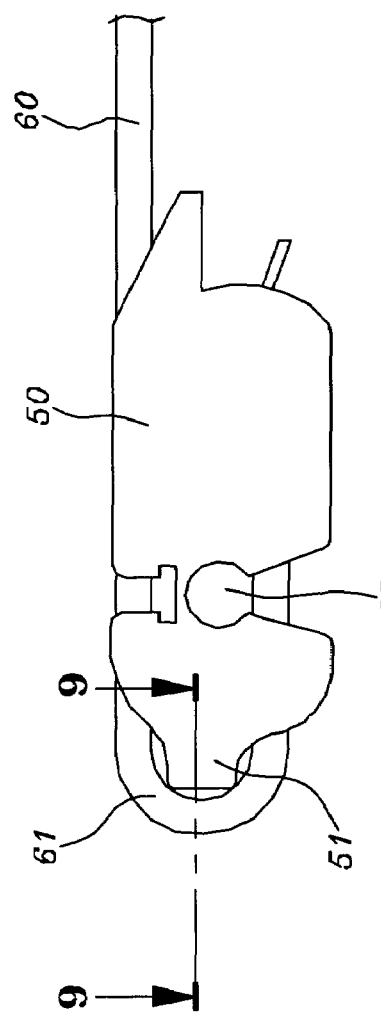
FIG. 8 shows a schematic view of the conventional hook-type wiper arm with conventional connector.
Figure 9:
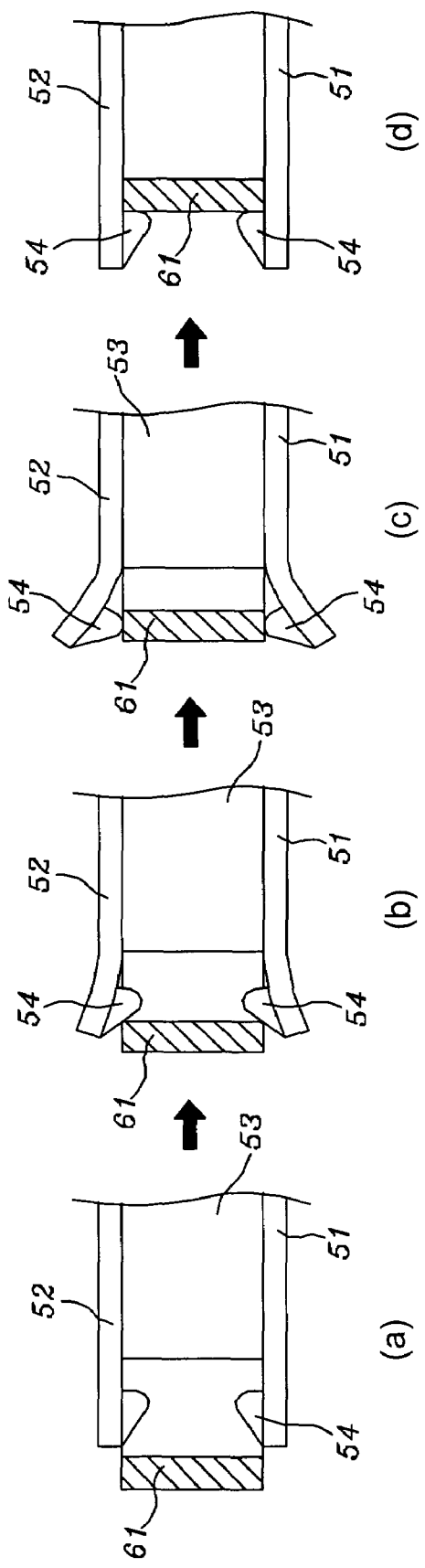
FIG. 9 is a sectional view taken along the direction indicated by a line 9-9 in FIG. 8.
Figure 10:
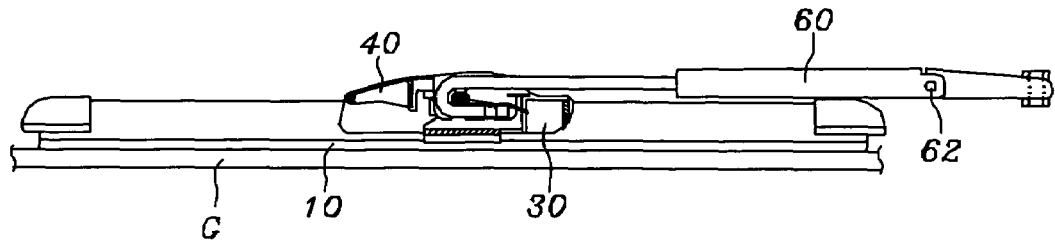
FIG. 10 shows a schematic view of the conventional connecting device used in support frameless wiper with hook-type wiper arm.
Figure 11:
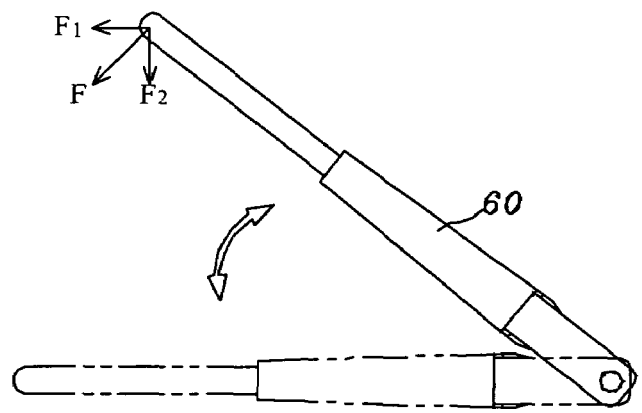
FIG. 11 shows a schematic view of the conventional connecting device used in support frameless wiper with hook-type wiper arm.
Figure 11:
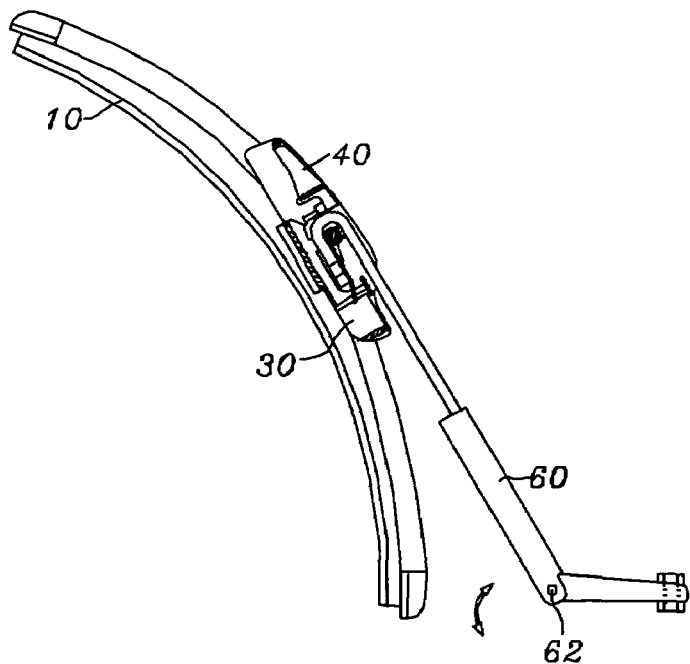
Figure 12:
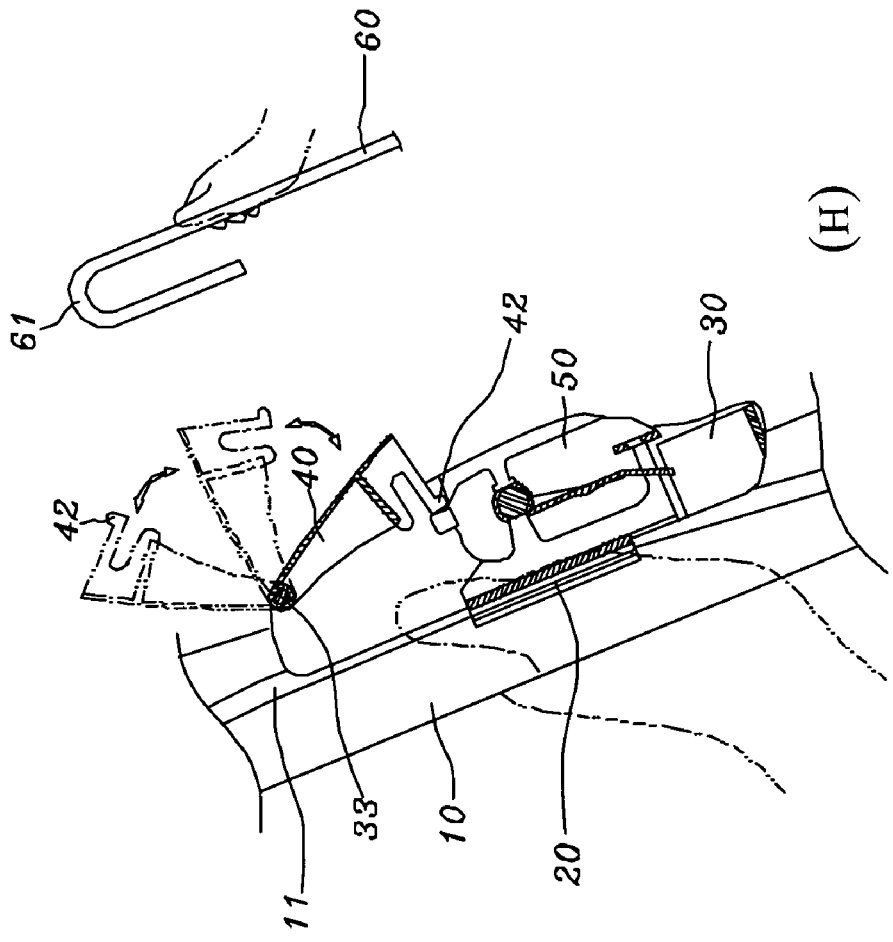
FIG. 12 is the illustrative view in dismounting and mounting of the conventional connecting device used in support frameless wiper with hook-type wiper arm.
Figure 12:
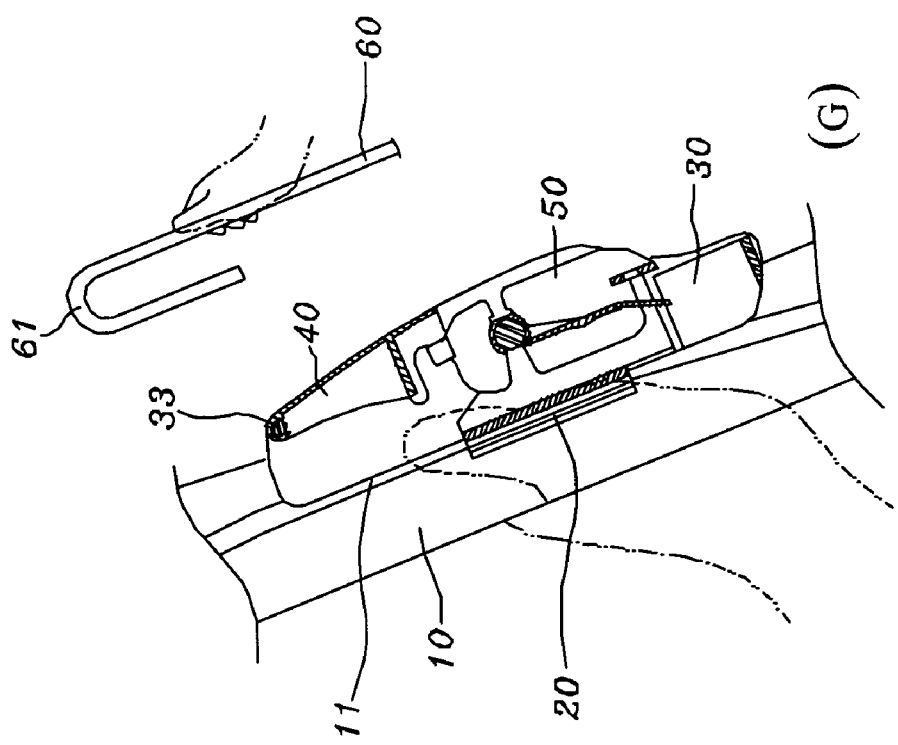
Figure 13:
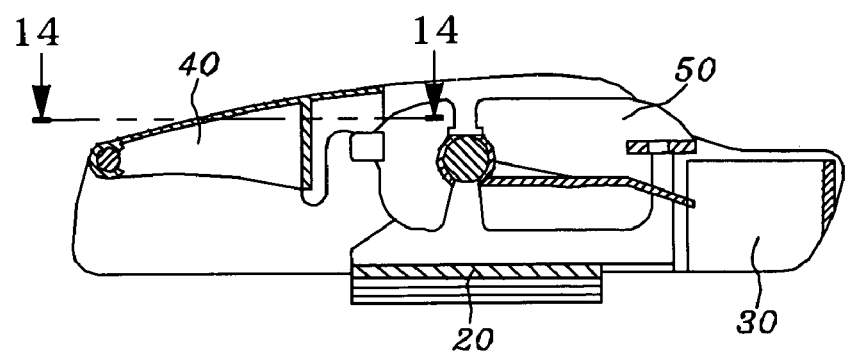
FIG. 13 is the illustrative sectional view of the conventional connecting device used in support frameless wiper.
Figure 14:
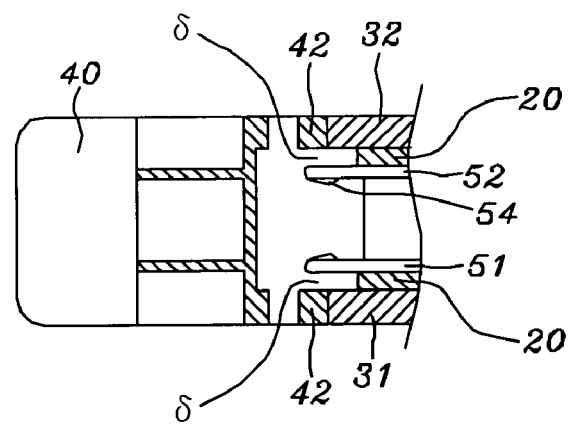
FIG. 14 is a sectional view taken along the direction indicated by a line 14-14 in FIG. 13.
Figure 15:
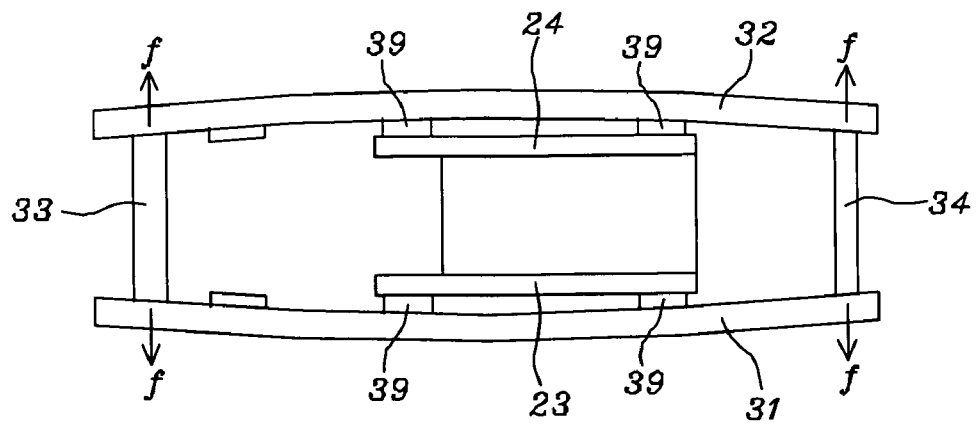
FIG. 15 shows a first schematic view of the frame hood and base in the conventional connecting device of support frameless wiper.
Figure 17:
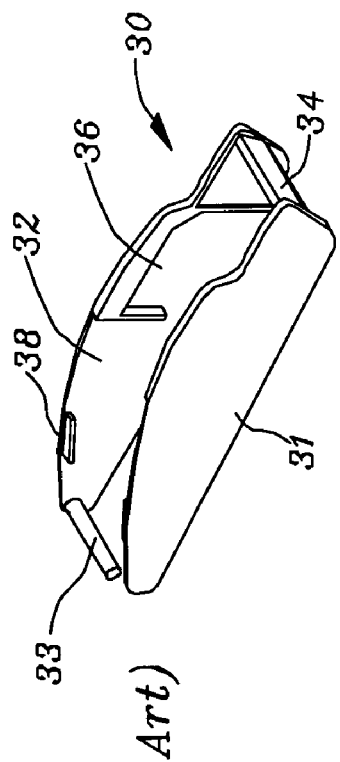
FIG. 17 is the perspective view of the damaged frame hood in the conventional connecting device of support frameless wiper.
Figure 16:
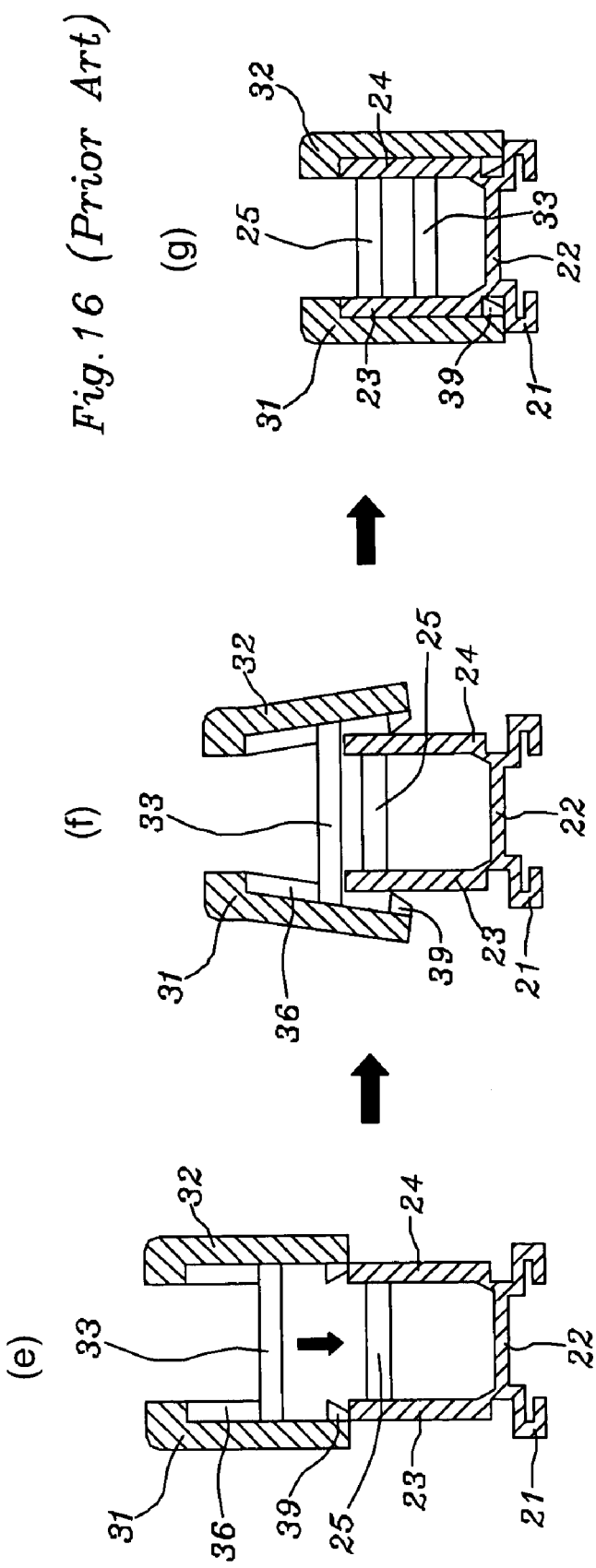
FIG. 16 shows a second schematic view of the frame hood and base in the conventional connecting device of support frameless wiper.
Figure 18:
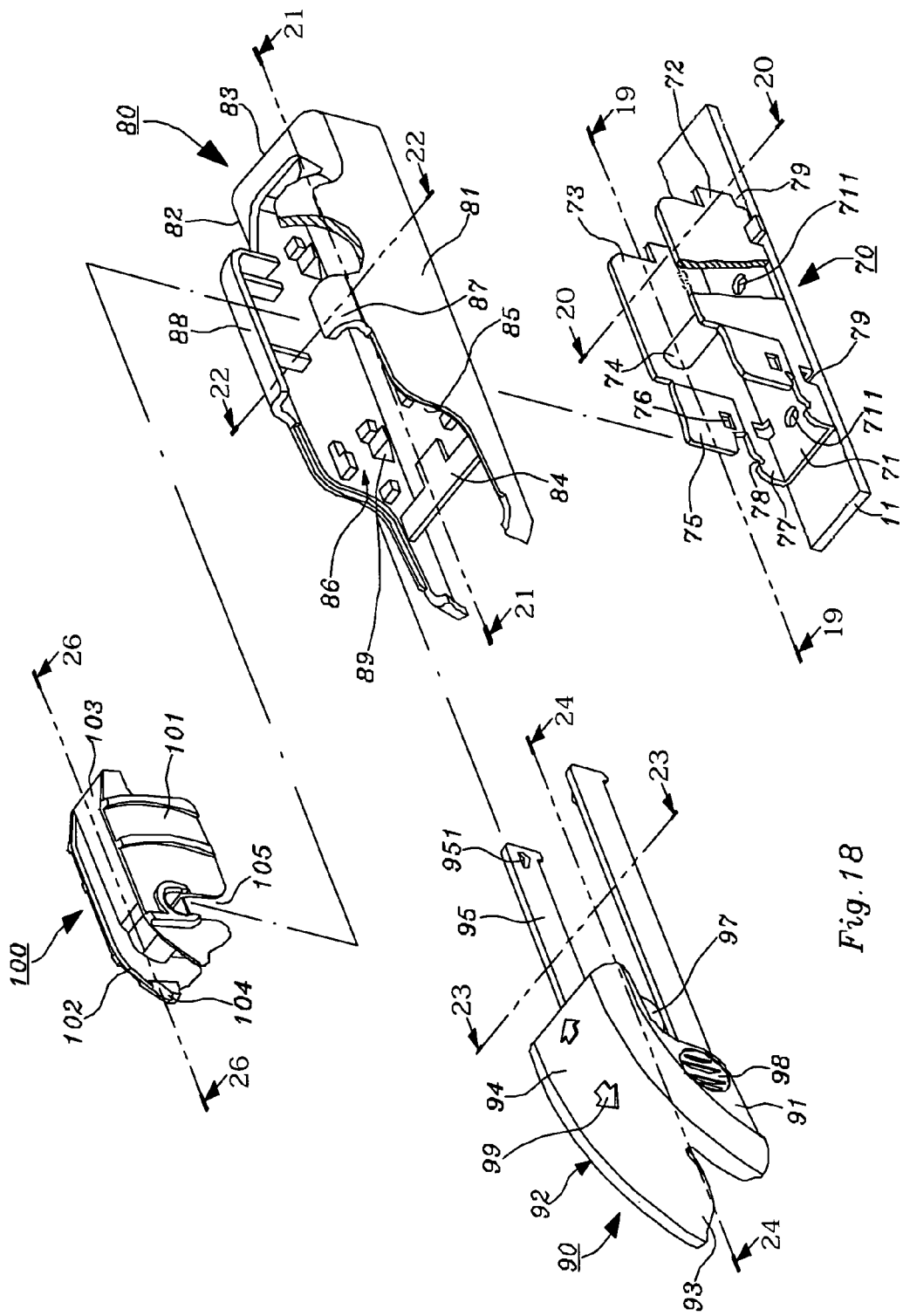
FIG. 18 is an exploded perspective view of the present invention.
Figure 19:
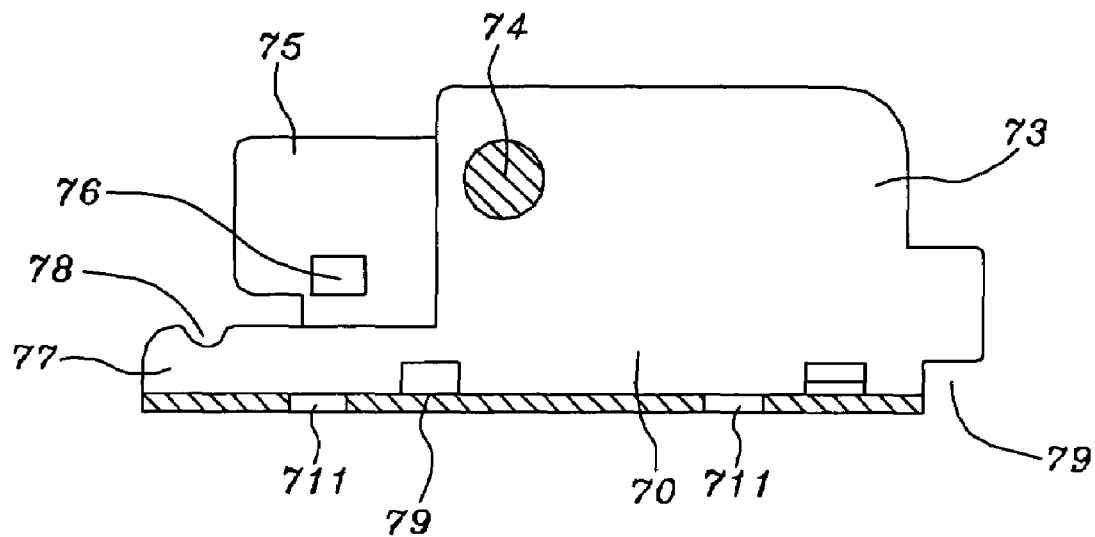
FIG. 19 is a sectional view taken along the direction indicated by a line 19-19 in FIG. 18.
Figure 20:
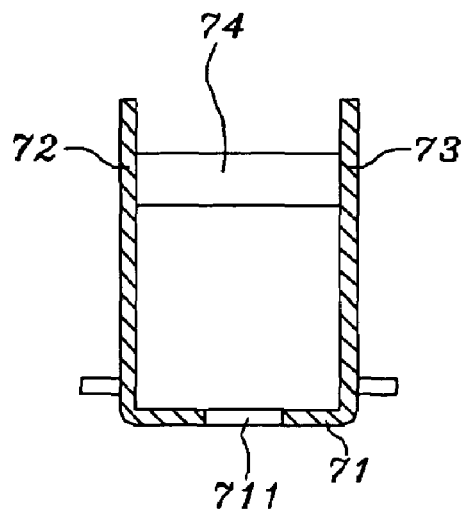
FIG. 20 is a sectional view taken along the direction indicated by a line 20-20 in FIG. 18.
Figure 21:
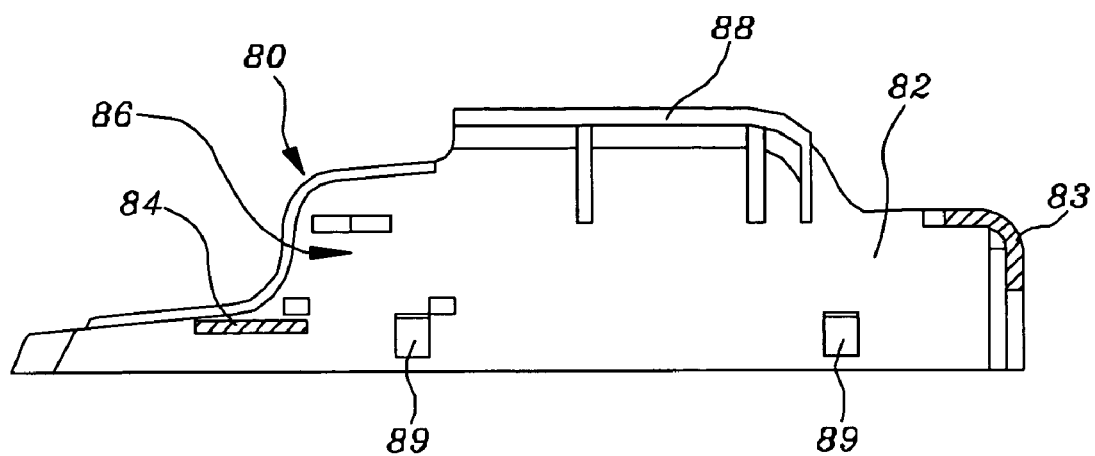
FIG. 21 is a sectional view taken along the direction indicated by a line 21-21 in FIG. 18.
Figure 22:
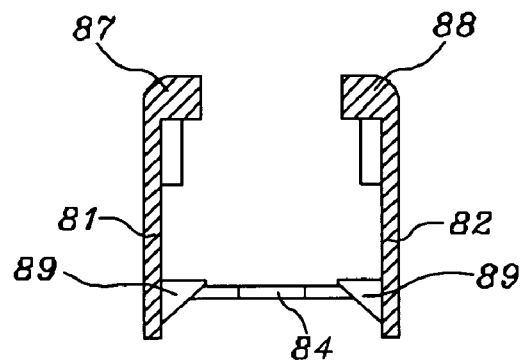
FIG. 22 is a sectional view taken along the direction indicated by a line 22-22 in FIG. 18.
Figure 23:
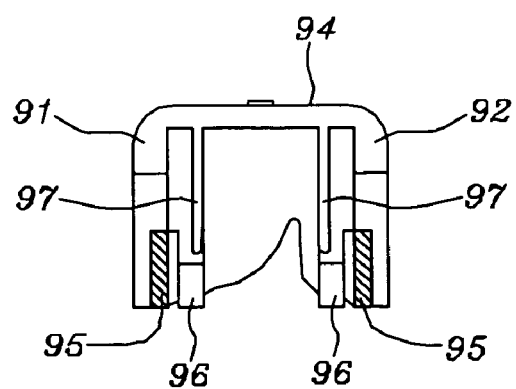
FIG. 23 is a sectional view taken along the direction indicated by a line 23-23 in FIG. 18.
Figure 24:
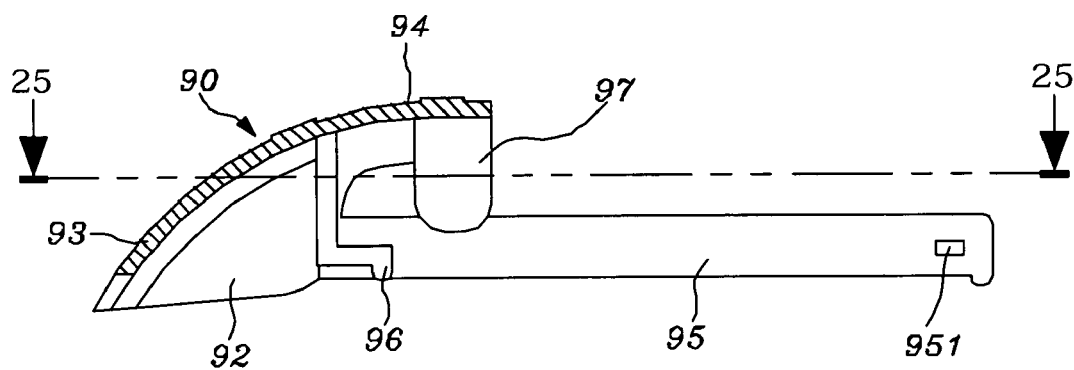
FIG. 24 is a sectional view taken along the direction indicated by a line 24-24 in FIG. 18.
Figure 25:
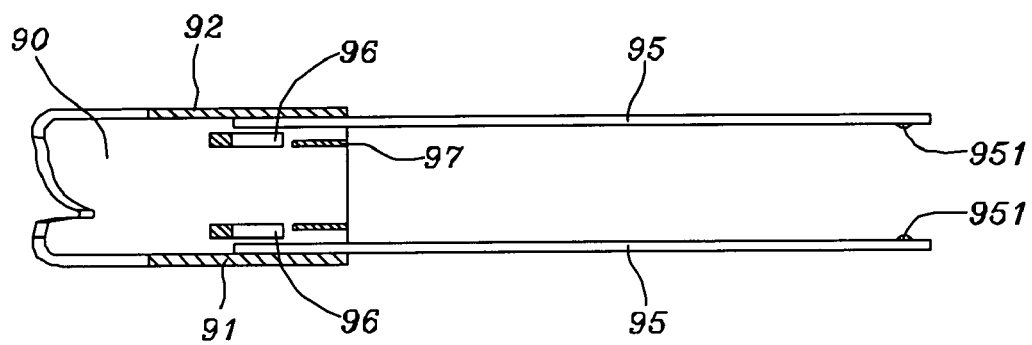
FIG. 25 is a sectional view taken along the direction indicated by a line 25-25 in FIG. 18.
Figure 26:
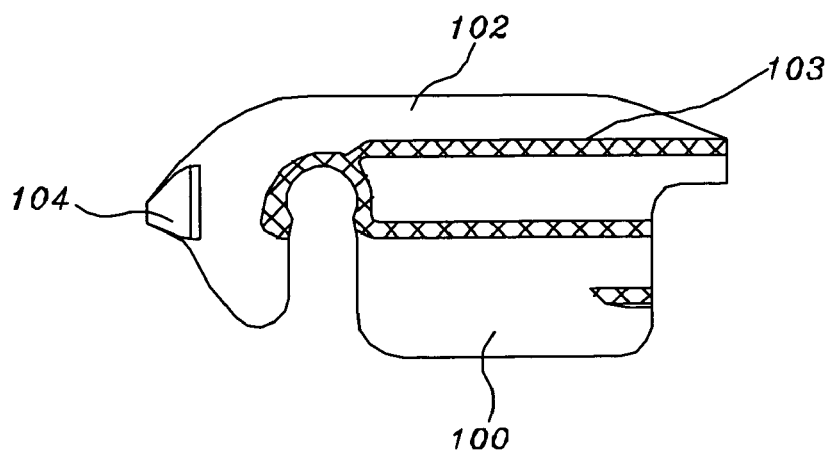
FIG. 26 is a sectional view taken along the direction indicated by a line 26-26 in FIG. 18.
Figure 27:
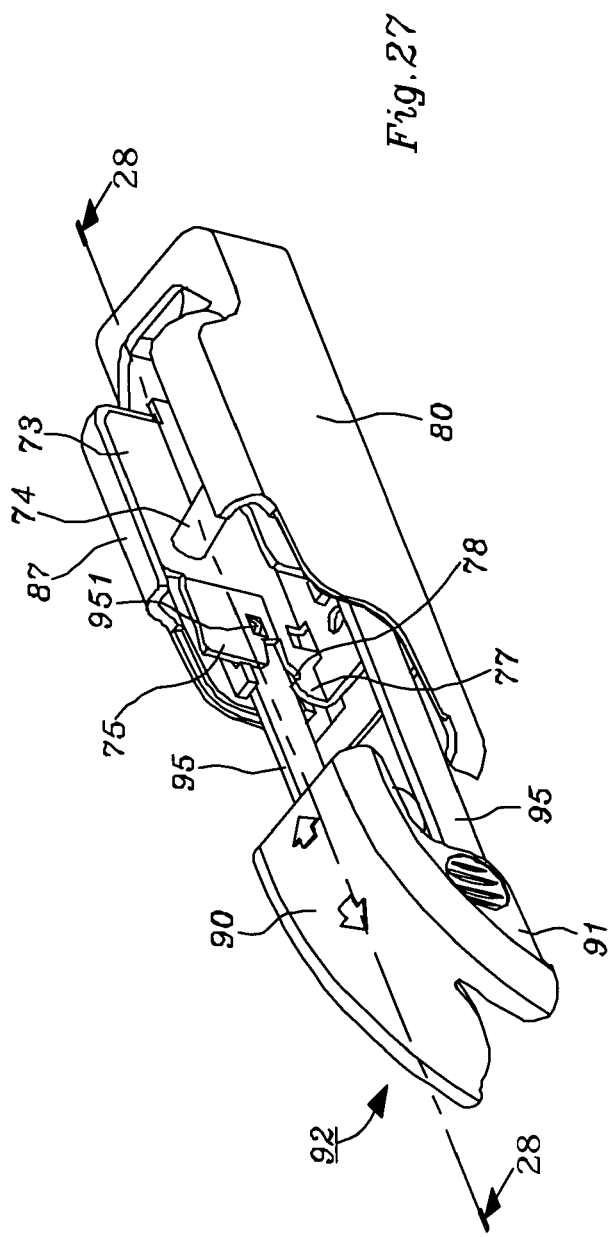
FIG. 27 is an operational illustrative view of the present invention.
Figure 28:
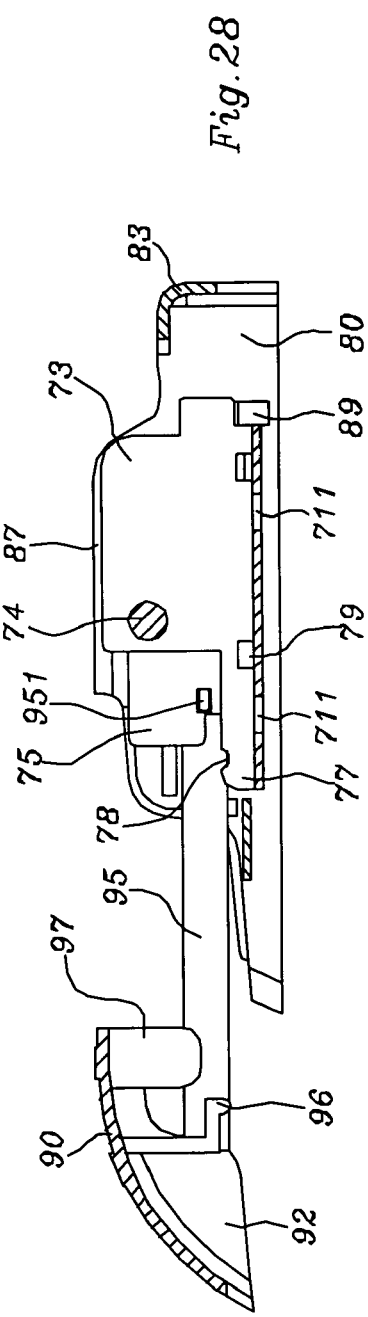
FIG. 28 is a sectional view taken along the direction indicated by a line 28-28 in FIG. 27.
Figure 29:
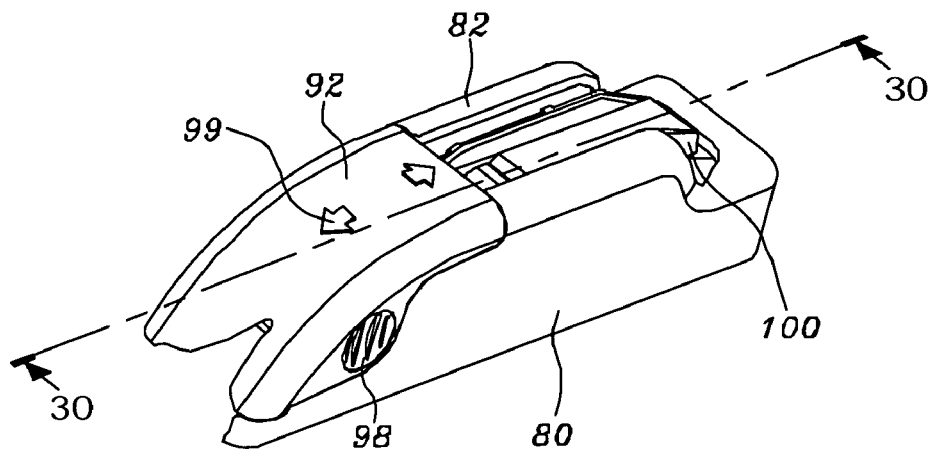
FIG. 29 is a assembly perspective view of the present invention.

Referring to FIG. 18 to FIG. 26, the present invention of connecting device for a windshield wiper having no support frame and hook type windshield wiper arm comprise:

A chassis 70, which being pressed of rigid metal, comprises a bottom panel 71, a left side panel 72 and a right side panel 73, wherein two fixing holes 711 are perforated in said bottom panel 71 to let two rivets (not shown in the figures) drive through so as to fix said chassis 70 onto the elastic metal strip 11 of the support frameless wiper 10; in which: A pair of symmetrical and parallel vertical left side panel 72 and right side panel 73 of same shape are longitudinally juxtaposed apart along both long sides respectively of said bottom panel 71 with a horizontal cross fixing spindle 74 straddling thereupon; Two insetting hole 76 are respectively formed on the pair of symmetrical and parallel front panels 75, which being disposed on both front ends of said left side panel 72 and right side panel 73; Two snap-fitting grooves 78 are respectively formed on both top sides of the pair of symmetrical and parallel vertical ledge panel 77, which being extended on both front ends of said front panels 75; Two pair of buckling grooves 79 are respectively formed on both of long jointing sides of said bottom panel 71 with said left side panel 72 and right side panel 73;

A saddle hood 80, which being an unitary extruding molded hollow cuboid of a plastic material, comprises a left hood panel 81, a right hood panel 82, a rear hood panel 83 and a straddle panel 84, wherein: Said left hood panel 81 and right hood panel 82 are a pair of symmetrical and parallel vertical panels of same shape being longitudinally juxtaposed apart; in which: A pair of horizontal left sliding groove 85 and right sliding groove 86, which being formed by two parallel arrays of some juts in up and down juxtaposition, are created on both corresponding insides at the middle section thereupon; A pair of left ceiling ledge 87 and right ceiling ledge 88 are protruded inwards on both corresponding top surfaces at the middle section thereupon; Two pair of snap-fitting noses 89 are disposed on both corresponding insides near the bottom edges thereupon to match with said two pair of buckling grooves 79; Said vertical rear hood panel 83 joints both rear ends of said left hood panel 81 and right hood panel 82 together to form an integral and continuous closed area; Said horizontal straddle panel 84 spans and joints near both front ends of said left hood panel 81 and right hood panel 82 such that a open mouthpiece being formed whereby;

A sliding cover 90, which being an unitary extruding molded body of a plastic material, comprises a left cover plate 91, a right cover plate 92, a front cover plate 93, a top cover plate 94, a pair of sliding rails 95 and a pair of pressing tongues 97, wherein: Said left cover plate 91 and right cover plate 92 are a pair of symmetrical and parallel vertical panels of same shape being longitudinally juxtaposed apart having front edges and top edges jointed together with the front cover plate 93 and top cover plate 94 respectively; A pair of symmetrical and parallel horizontal sliding rails 95 are longitudinally juxtaposed apart extending backwards on both corresponding insides at the bottom portion of said left cover plate 91 and right cover plate 92 with each insetting jut 951 being respectively set near each distal free end of said sliding rails 95; In the inner side of said top cover plate 94, a pair of symmetrical and parallel elastic buckling hook 96 are vertically juxtaposed apart extending downwards on both corresponding insides at each front fixed end of said sliding rails 95 thereupon; A pair of symmetrical and parallel pressing tongue 97 are also vertically juxtaposed apart extending downwards in the inner side adjacent to rear edge of said top cover plate 94; A pair of opposing direction arrows 99 are marked on the top surface of said top cover plate 94 to indicate the sliding direction; A pair of anti-sliding grid 98 are respectively formed on the outer surface of said left cover plate 91 and right cover plate 92 for increasing the holding friction of the fingers; and A connector 100, which being an unitary extruding molded cuboid of a plastic material, mainly comprises a pair of symmetrical and parallel vertical left side plate 101 and right side plate 102 of same shape being longitudinally juxtaposed apart having top edges jointed together with a horizontal body plate 103 such that becoming an integral body, wherein: A pair of symmetrical buckling nose 104 are juxtaposed apart on the insides at each front end of said left side plate 101 and right side plate 102 respectively such that together with said body plate 103 forming a containing space just accommodating the hook head 61 of said hook-type wiper arm 60; A round groove 105 with opening downwards is formed on the front end of said body plate 103, which locating at the middle section of said left side plate 101 and right side plate 102; By said round groove 105 means of directly insetting with the fixing spindle 74 on said chassis 70, said connector 100 can freely pivot within a limited angle thereupon.

Refer to FIGS. of 18, 27 through 33 and 34, the shown is the mounting way and step of the present invention. First, align two parallel sliding rails 95 on said sliding cover 90 with said left sliding groove 85 and right sliding groove 86 on said saddle hood 80, then apply slight force to push it so that said sliding cover 90 can inset with said saddle hood 80 each other; Next, align the bottom side of said saddle hood 80 with the top side of said chassis 70 and press and slip it downwards so as to inset with said chassis 70 each other; During this process, four snap-fitting noses 89 on said saddle hood 80 and left hood panel 81 will slightly expand outwards owing to the butting and pushing force from said left side panel 72 and right side panel 73 on said rigid chassis 70 first, then slip downwards until a buckling snap in finishing of insetting said saddle hood 80 with said chassis 70 each other (as shown in the FIG. 42); Finally, align the opening of said round groove 105 on said connector 100 with said fixing spindle 74 on said chassis 70, then apply force pressing downwards to let said round groove 105 inset with said fixing spindle 74 so that to complete the mounting procedure; This moment, said sliding cover 90 can freely slide along said left sliding groove 85 and right sliding groove 86 at will by means of said two sliding rails 95; When pulling away up to said two insetting juts 951 on said sliding rails 95 buckling with two insetting holes 76 on said left side panel 72 and right side panel 73 in accompanying a snap sound, said sliding cover 90 is in maximum distance with said saddle hood 80 (as shown in the FIGS. of 27 and 28); While pushing close up to said two elastic buckling hooks 96 buckling with two snap-fitting grooves 78 on said vertical ledge panel 77 in accompanying a nap sound, said sliding cover 90 is united with said saddle hood 80 becoming an integral body (as shown in the FIGS. of 29 and 30).

Figure 30:
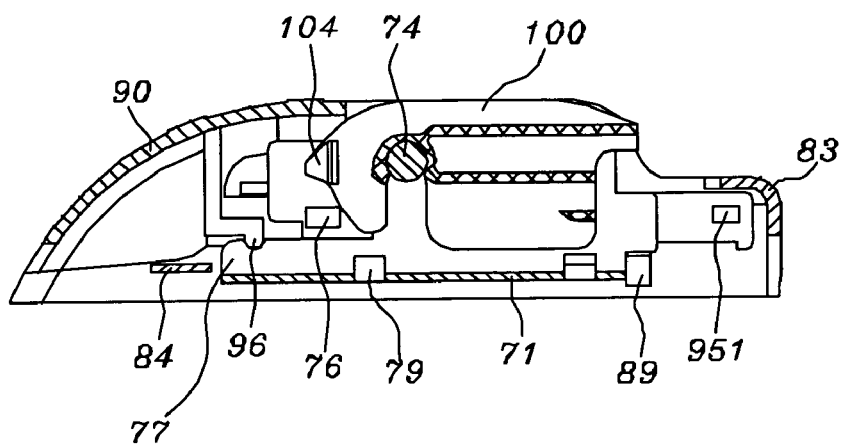
FIG. 30 is a sectional view taken along the direction indicated by a line 30-30 in FIG. 29.
Figure 31:
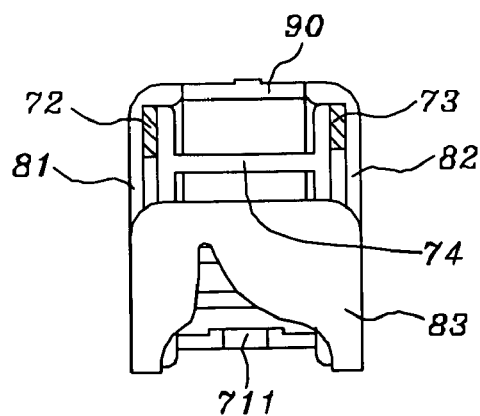
FIG. 31 is the left side view of the present invention.
Figure 32:
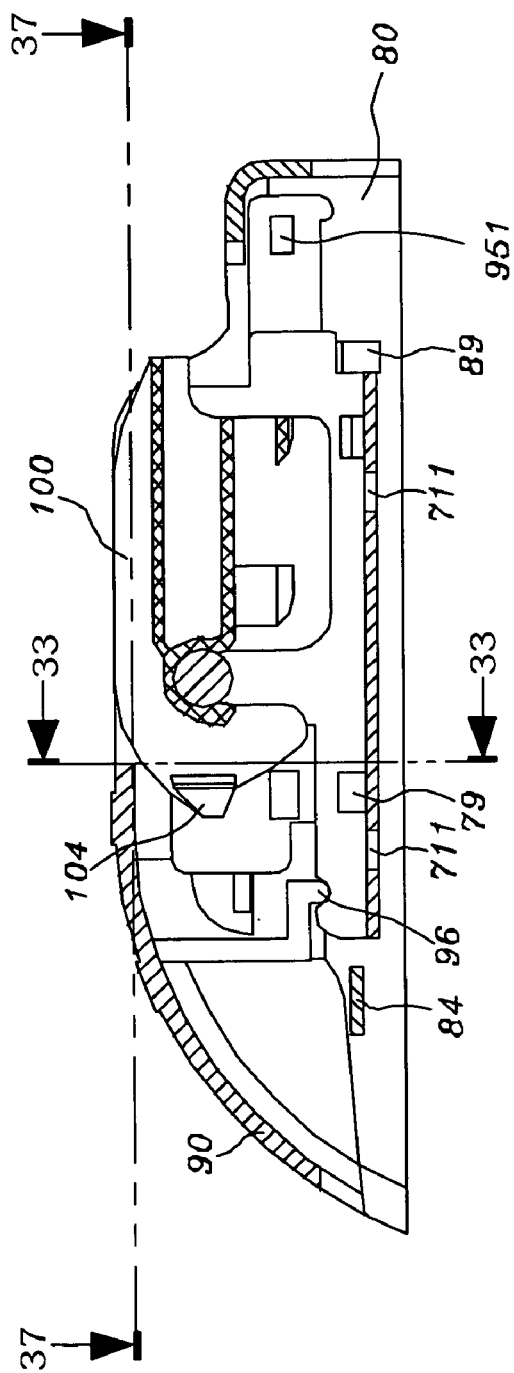
FIG. 32 is the sectional plane view of the present invention in combination.
Figure 33:
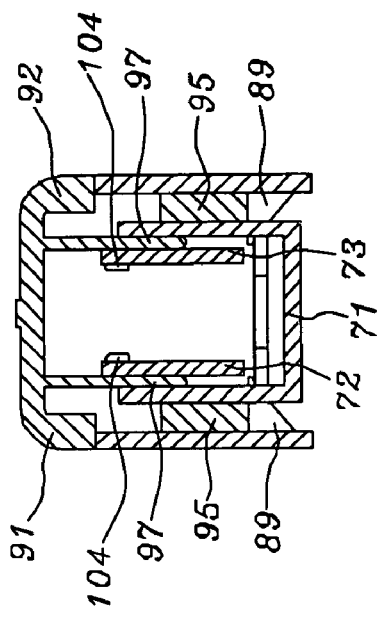
FIG. 33 is a sectional view taken along the direction indicated by a line 33-33 in FIG. 32.
Figure 34:
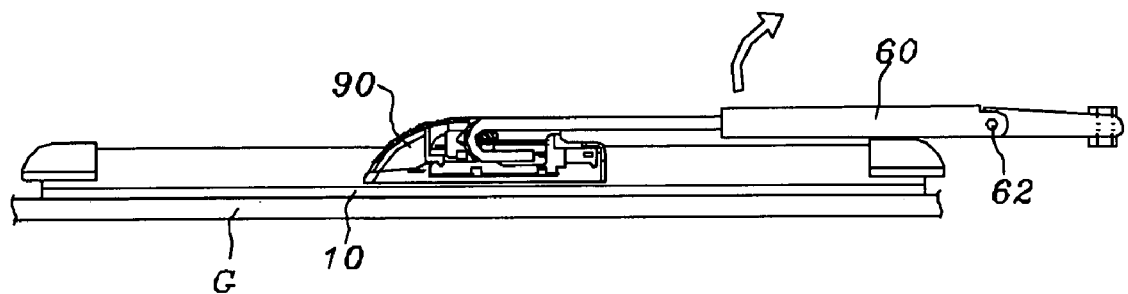
FIG. 34 is the first illustrative application view of the present invention with hook-type wiper arm.
Figure 35:
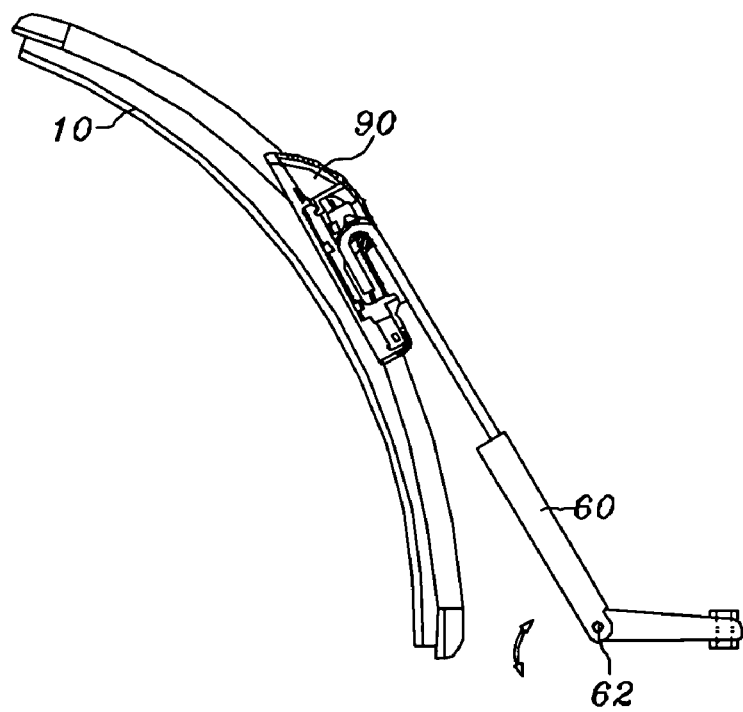
FIG. 35 is the second illustrative application view of the present invention with hook-type wiper arm.
Figure 36:
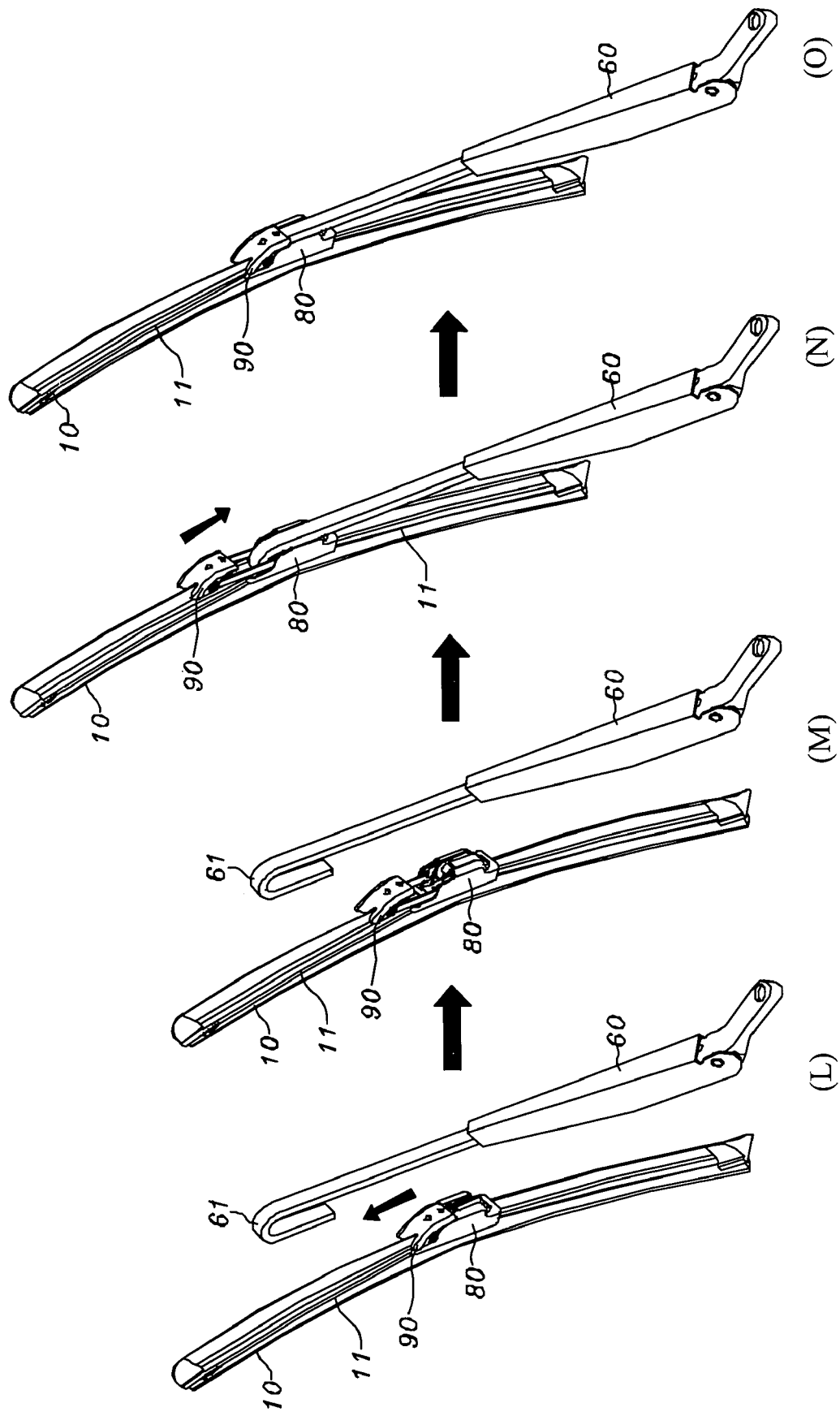
FIG. 36 is the illustrative view in dismounting and mounting of the present invention with hook-type wiper arm.
Figure 37:
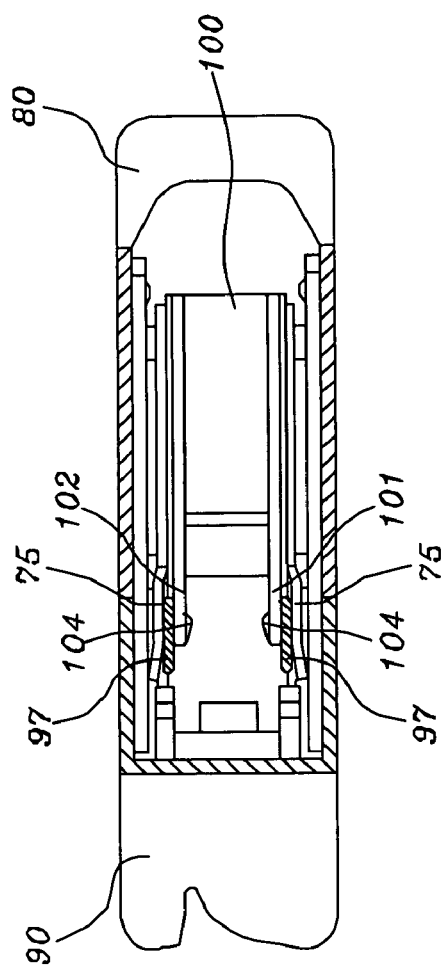
FIG. 37 is a sectional view taken along the direction indicated by a line 37-37 in FIG. 32.
Figure 38:
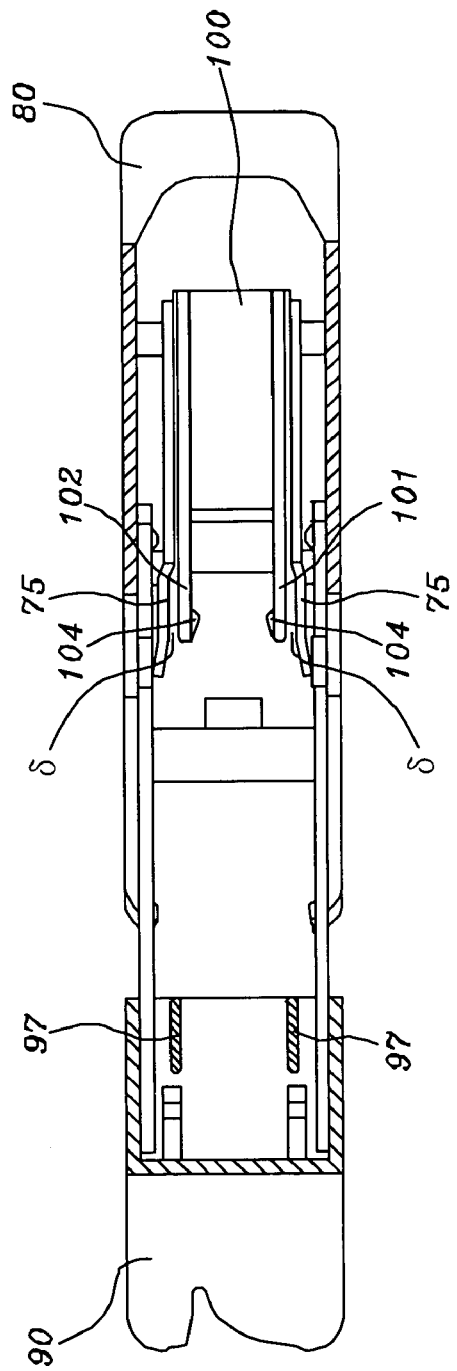
FIG. 38 is the operational illustrative view of the FIG. 37.
Figure 39:
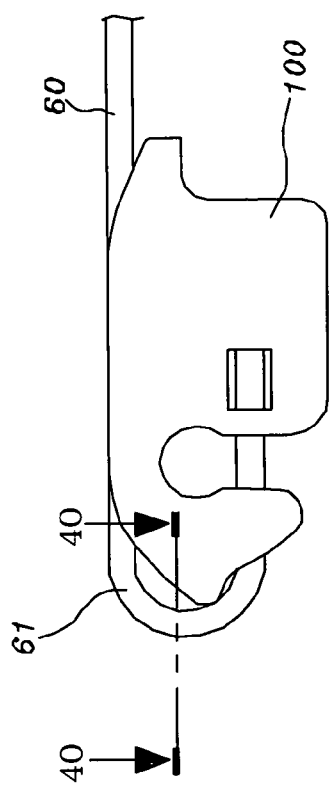
FIG. 39 is the combination illustrative view of the present invention with connector.
Figure 40:
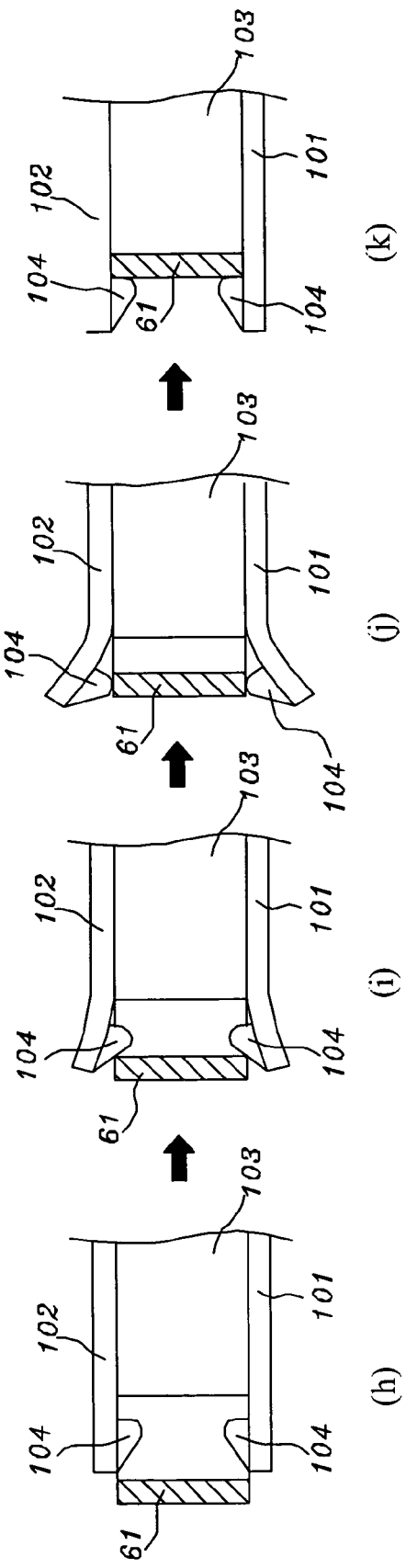
FIG. 40 is a sectional view taken along the direction indicated by a line 40-40 in FIG. 39.

Refer to FIGS. of 27, 28, 30 and 34 through 40 for showing the replacing support frameless wiper 10, Just as conventional windshield wiper aforesaid in the process of replacing wiper, apply a force upwards to the hook-type wiper arm 60, which being original pressed closely on the windshield G in horizontal manner (as shown in the FIG. 34), so that lift it up in upright position by said elastic foldable articulation 62 as fulcrum means of obsolete "support frameless wiper" detaching away off said windshield (as shown in the FIG. 35) so as to start dismount and replace support frameless wiper 10; Hence, the saddle hood 80 is always in upright position no matter of dismounting or mounting procedure; The steps of dismounting or mounting procedure is easy as below: First, pull said sliding cover 90 away from said saddle hood 80 up to said two insetting juts 951 on said sliding rails 95 buckling with said snap-fitting groove 78 in accompanying a snap sound (as shown in FIGS. of 27, 28 and view M of the FIG. 36) so that said sliding cover 90 being kept above said saddle hood 80 unable to drop downwards by means of buckling said insetting juts 951 with said snap-fitting groove 78 each other; Meanwhile, a gapδ is created between said left side plate 101 with right side plate 102 and said front panels 75 on said chassis 70 owing to the pressing tongue 97 on said sliding cover 90 detaching off the buckling of said left side plate 101 and right side plate 102 (as shown in the FIG. 38); Hence, said hook head 61 can unobstructedly inset with said connector 100 steadily (as shown in each view at FIGS. of 39 and 40 as well as view N of the FIG. 36); Finally, push said sliding cover 90 back towards said saddle hood 80 up to said elastic buckling hook 96 buckling with said snap-fitting groove 78 on said chassis 70 in accompanying a snap sound (as shown in the FIG. 30 and view 0 of the FIG. 36); Meanwhile, said pressing tongue 97 on said sliding cover 90 rebounds to fill said two gapsδ between said left side plate 101 with right side plate 102 and said front panels 75 on said chassis 70 so as to block said two buckling noses 104 on the front end of said connector 100 from displacing outwards (as shown in the FIG. 37) and to further ensure said hook-type wiper arm 60 unable to detach off said connector 100 during swing operation.

Figure 41:
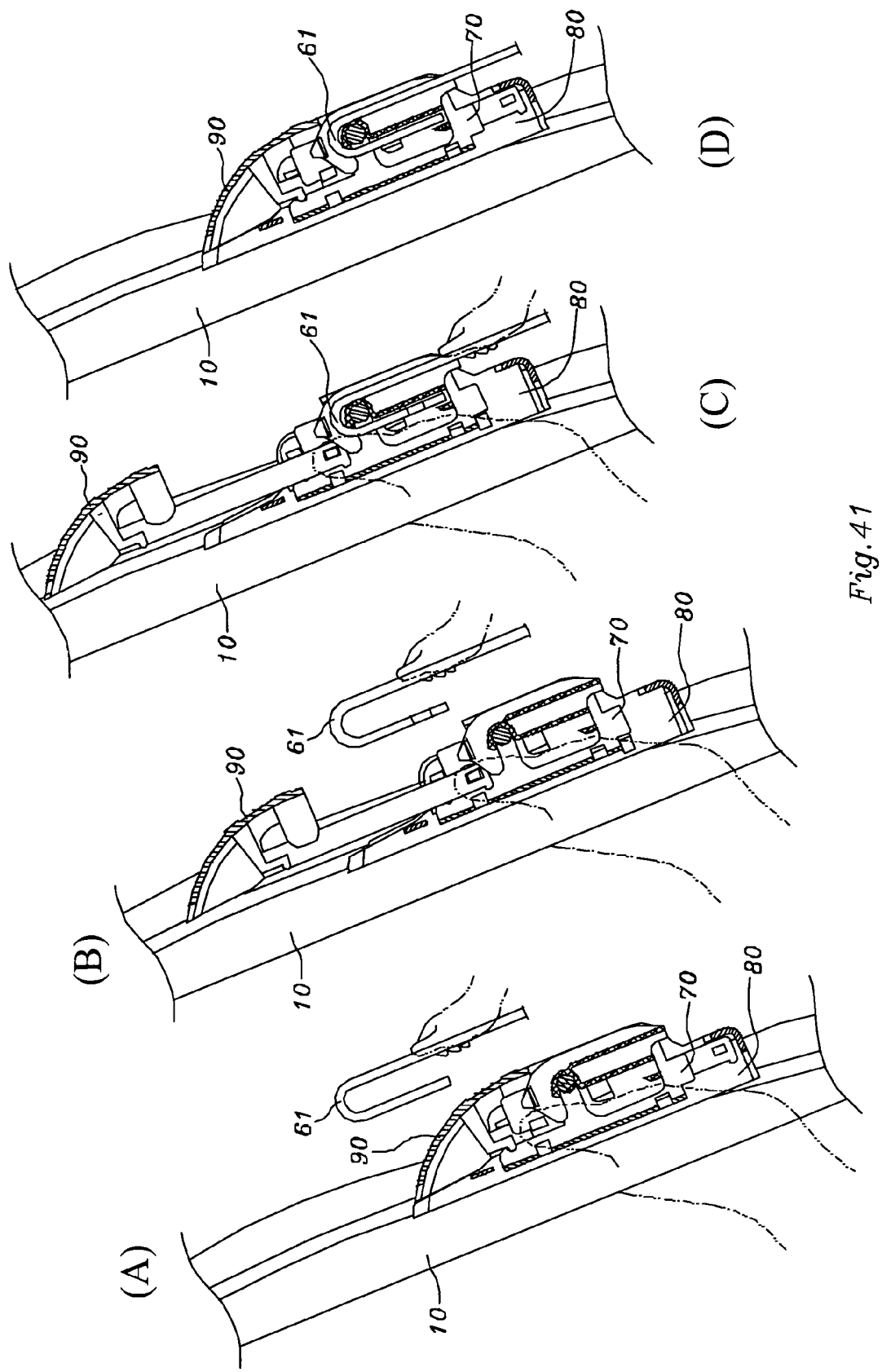
FIG. 41 is the illustrative view in dismounting and mounting of the present invention with hook-type wiper arm.

Refer to each view of the FIG. 41, during the dismounting and mounting procedure of replacing operation, only one person without any help from anyone else can easily and quickly complete all process; Meanwhile, not only the interference of bumping said hook head 61 by unwillingly dropping of conventional pivotable cover 40 aforesaid can be prevented, but also any subsequent damage of other component can be avoided.

Figure 42:
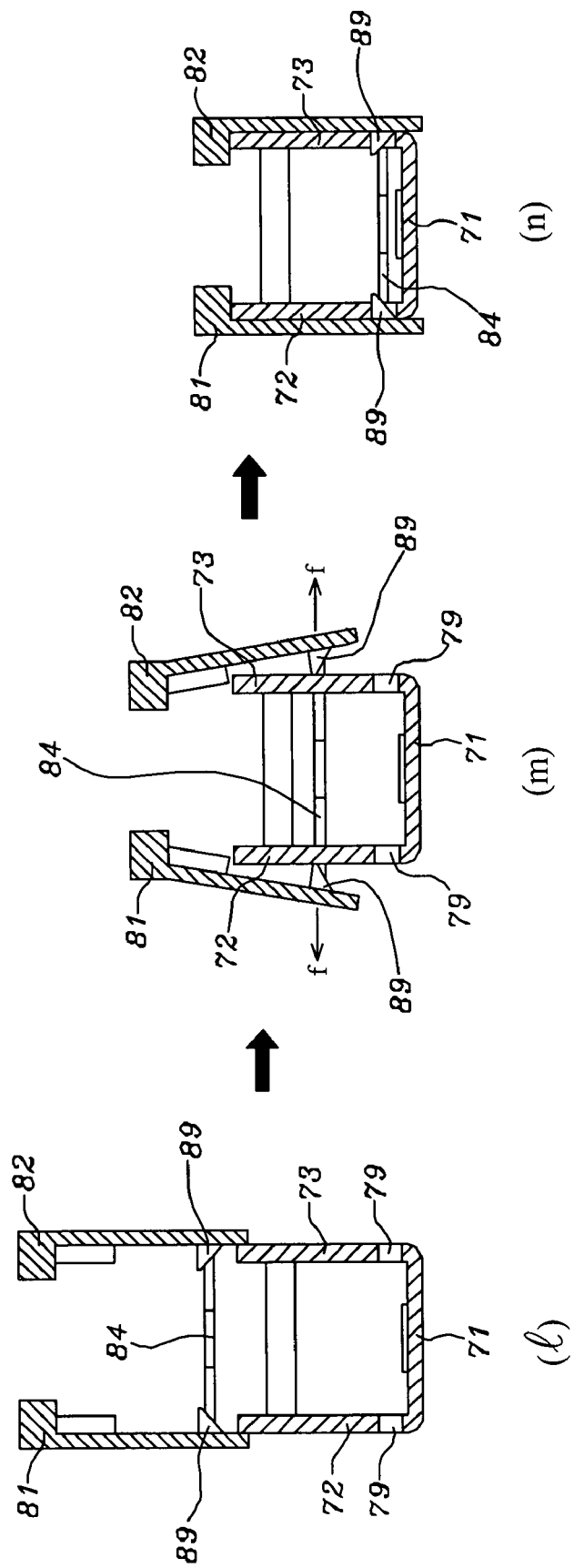
FIG. 42 is the illustrative sectional view of the chassis and saddle hood in the present invention.

Refer to FIGS. of 21 and 42, said straddle panel 84 and rear hood panel 83 will be subjected to the axial stress f owing to the expansion outwards of said left hood panel 81 and right hood panel 82 during inset mounting procedure of said saddle hood 80 with chassis 70 in the present invention (as shown in view m of the FIG. 42); Such axial stress f will be evenly distributed on both of said straddle panel 84 and rear hood panel 83 because their same rectangular cross section with equivalent area; Thus, the breaking damage happened in conventional connecting device aforesaid due to uneven stress and un-equivalent area can be avoided.

What is claimed is:

1. A connecting device for a windshield wiper having no support frame and hook type windshield wiper arm comprises:

a chassis, which being pressed of rigid metal, comprises a bottom panel, a left side panel and a right side panel, wherein two fixing holes are perforated in said bottom panel;

said left side panel and right side panel being symmetrical and parallel vertical panels having a same shape and being longitudinally juxtaposed apart along first and second long sides respectively of said bottom panel with a horizontal cross fixing spindle straddling thereupon;

a pair of symmetrical and parallel front panels being disposed on a front end of said left side panel and right side panel, respectively, and each having an insetting hole formed therein;

a pair of symmetrical and parallel vertical ledge panels being extended on both front ends of said front panels and each having a top side, each top side having a snap-fitting groove formed therein;

said bottom panel forming first and second long jointing sides, respectively, with said left side panel and right side panel, each long jointing side having a pair buckling grooves formed therein;

a saddle hood, which being an unitary extruded molded hollow cuboid of a plastic material, comprises a left hood panel, a right hood panel, a vertical rear hood panel and a horizontal straddle panel, wherein: Said left hood panel and right hood panel are a pair of symmetrical and parallel vertical panels of same shape being longitudinally juxtaposed apart; in which:

A pair of horizontal left and right sliding grooves being formed by two parallel arrays of some juts in up and down juxtaposition, are created on both corresponding insides at a middle section of the saddle hood;

A pair of left and right ceiling ledges are protruded inwards from corresponding top surfaces at the middle section thereupon;

a pair of snap-fitting noses are disposed on each corresponding inside near a bottom edge thereupon to match with said pair of buckling grooves;

Said vertical rear hood panel joins a rear end of each of said left hood panel and right hood panel together to form an integral and continuous closed area;

Said horizontal straddle panel spans across and is joined to said left and right hood panels near a respective front end of each of said left hood panel and right hood panel, such that a open mouthpiece is formed; and a sliding cover, which being a unitary extruded molded body of a plastic material, comprises a left cover plate, a right cover plate, a front cover plate, a top cover plate, a pair of sliding rails and a pair of pressing tongues, wherein:

Said left cover plate and right cover plate are a pair of symmetrical and parallel vertical panels of same shape being longitudinally juxtaposed apart having front edges and top edges jointed together with the front cover plate and top cover plate respectively;

said pair of sliding rails are symmetrical and parallel and are longitudinally juxtaposed apart extending backwards from corresponding insides at a bottom portion of said left cover plate and right cover plate with each sliding rail having an insetting jut being respectively set near a respective distal free end of each sliding rail;

a pair of symmetrical and parallel elastic buckling hooks juxtaposed apart and extending vertically downwards from an inner side of said top cover plate corresponding to a respective front fixed end of each of said sliding rails thereupon;

said pair of symmetrical and parallel pressing tongues also juxtaposed apart and extending vertically downwards in the inner side adjacent to a rear edge of said top cover plate; and a connector, which being an unitary extruded molded cuboid of a plastic material, comprises symmetrical and parallel vertical left and right side plates having a same shape and being longitudinally juxtaposed apart and having top edges joined together with a horizontal body plate to define an integral body, wherein: A pair of symmetrical buckling noses are juxtaposed apart on an inside at a front end of said left side plate and right side plate respectively such that together with said body plate, a containing space is formed; A round groove with a downwardly facing opening is formed on a front end of said body plate, which is located at a middle section of said left side plate and right side plate.

2. A connecting device as recited in the claim 1, wherein a direction arrow is marked on a top surface of said top cover plate of said sliding cover; and an anti-sliding grid is respectively formed on an outer surface of said left cover plate and right cover plate.

* * * * *